United States Patent
Tomizawa et al.

(10) Patent No.: US 9,602,705 B2
(45) Date of Patent: *Mar. 21, 2017

(54) IMAGING SYSTEM AND CONTROL METHOD FOR IMAGING SYSTEM

(71) Applicant: Olympus Corporation, Hachioji-shi, Tokyo (JP)

(72) Inventors: Masaomi Tomizawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,048

(22) Filed: Jan. 26, 2015

(65) Prior Publication Data

US 2015/0138438 A1    May 21, 2015

Related U.S. Application Data

(63) Continuation of application No. 13/670,616, filed on Nov. 7, 2012, now Pat. No. 8,970,774.

(30) Foreign Application Priority Data

Nov. 7, 2011  (JP) ................................. 2011-243150

(51) Int. Cl.
  *H04N 5/225* (2006.01)
  *H04N 5/232* (2006.01)
(52) U.S. Cl.
  CPC ....... *H04N 5/2254* (2013.01); *H04N 5/23209* (2013.01); *H04N 5/23216* (2013.01); *H04N 5/23293* (2013.01)
(58) Field of Classification Search
  None
  See application file for complete search history.

(56) References Cited

U.S. PATENT DOCUMENTS

| 5,680,647 A | 10/1997 | Kirigaya et al. |
| 6,445,416 B1 * | 9/2002 | Kyuma ................. G02B 7/102 348/240.3 |

(Continued)

FOREIGN PATENT DOCUMENTS

JP  2003-259177  9/2003

OTHER PUBLICATIONS

Office Action to Japanese Patent Application No. 2011-243150, mailed on Sep. 2, 2015 (2 pgs.).

(Continued)

*Primary Examiner* — Jason Flohre
*Assistant Examiner* — Wesley Chiu
(74) *Attorney, Agent, or Firm* — John C. Pokotylo; Straub & Pokotylo

(57) ABSTRACT

An imaging system of the present invention comprises a lens unit having a barrel section that contains a photographing optical system, and an operating section provided on the barrel section, and a camera body having an imaging section for converting a subject image formed by the photographing optical system into electrical signals, and a display section for displaying the subject image based on the electrical signals, wherein the lens unit has a transmission section for transmitting information relating to the operation section, and the camera body has a receiving section for receiving information relating to the operating section that has been transmitted from the transmission section, and an association section for displaying the information relating to the operation section that has been received by the receiving section on the display section, and associating information relating to the operating section with functions of the camera body.

13 Claims, 15 Drawing Sheets

(56) References Cited

U.S. PATENT DOCUMENTS

| | | | | |
|---|---|---|---|---|
| 8,970,774 B2 * | 3/2015 | Tomizawa | ......... | H04N 5/23293 348/333.02 |
| 2010/0208122 A1 * | 8/2010 | Yumiki | ................ | G02B 7/021 348/333.08 |
| 2010/0238321 A1 * | 9/2010 | Honjo | .................... | G02B 7/102 348/231.99 |
| 2011/0129151 A1 * | 6/2011 | Saito | ...................... | H04N 5/232 382/181 |
| 2011/0199498 A1 * | 8/2011 | Matsuzawa | ............ | H04N 5/232 348/220.1 |
| 2011/0267503 A1 * | 11/2011 | Kunishige | ............. | H04N 5/232 348/240.1 |
| 2011/0267526 A1 | 11/2011 | Ishihara | | |
| 2012/0127189 A1 * | 5/2012 | Park | .................... | H04N 5/23293 345/581 |
| 2012/0147219 A1 * | 6/2012 | Yang | .................... | H04N 5/2251 348/231.4 |
| 2014/0098273 A1 * | 4/2014 | Ito | ...................... | H04N 5/23216 348/333.03 |

OTHER PUBLICATIONS

Second Japanese Office Action to corresponding Japanese Patent Application No. 2011-243150, mailed on Apr. 4, 2016 (2 pgs.).

* cited by examiner

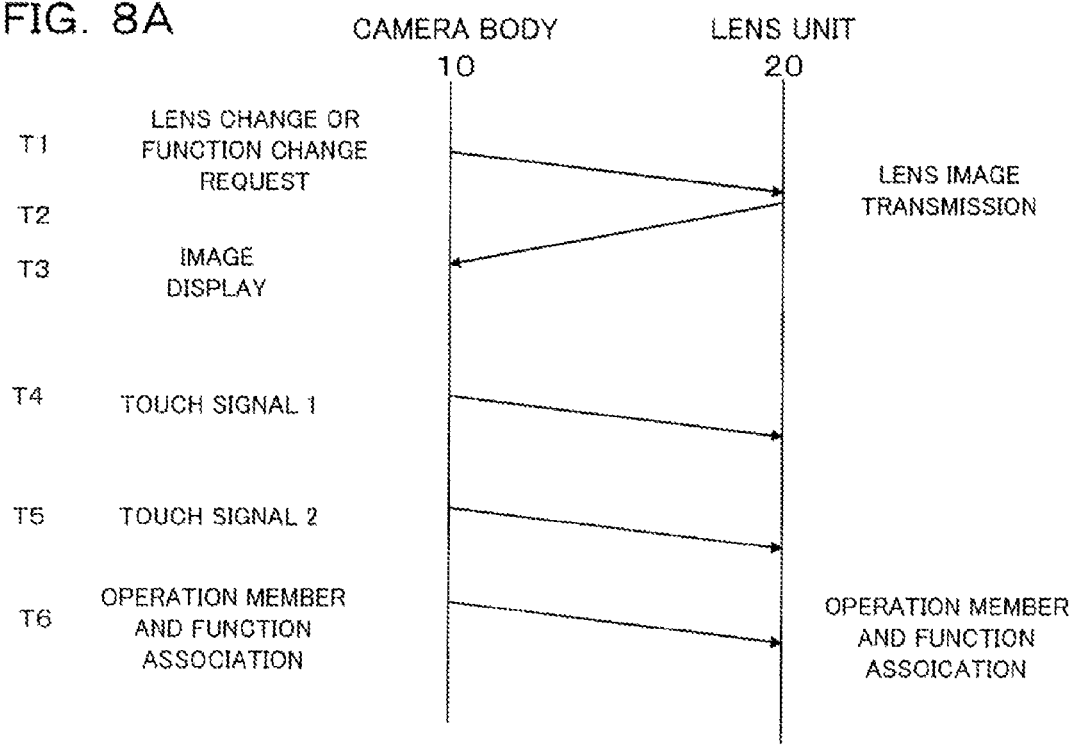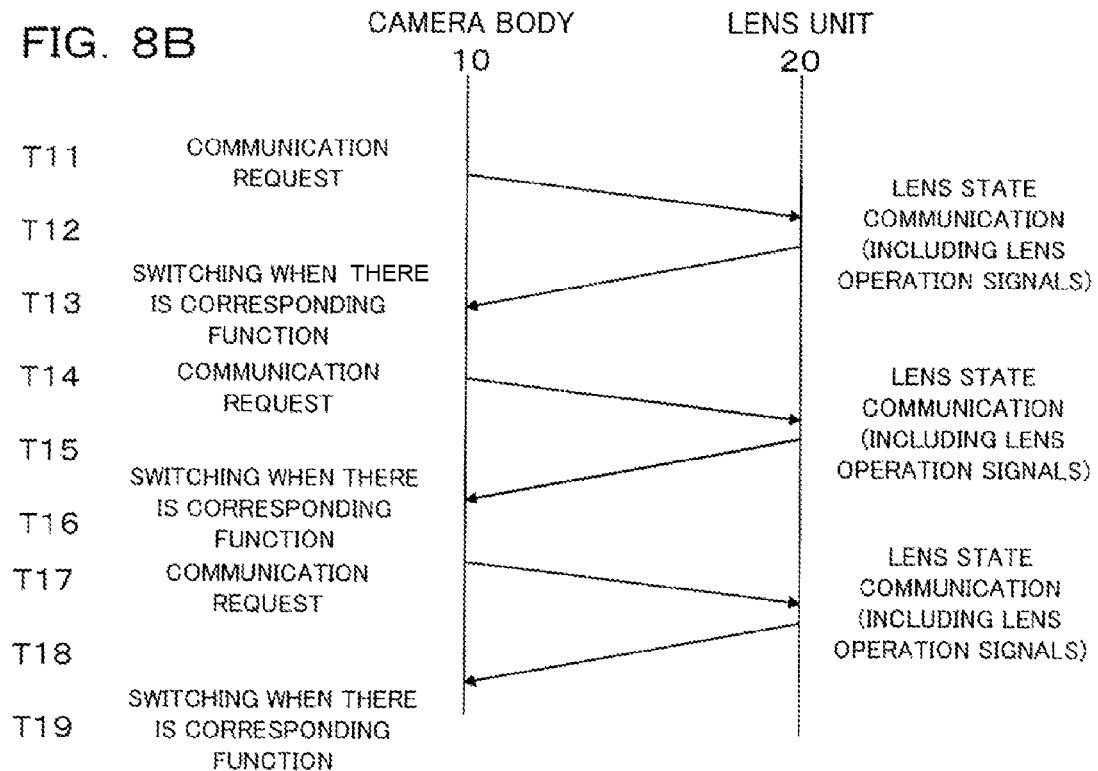

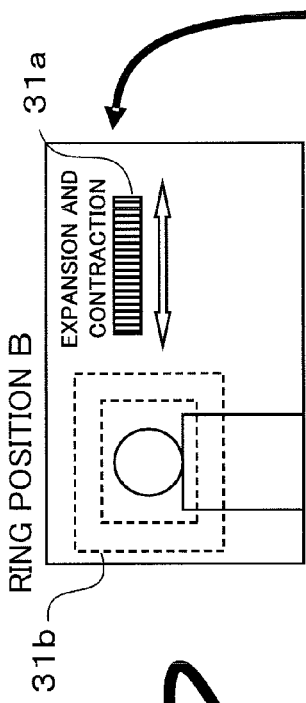
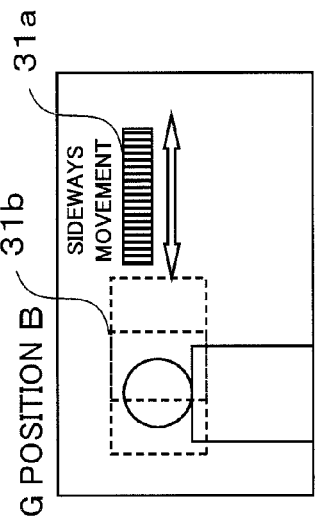
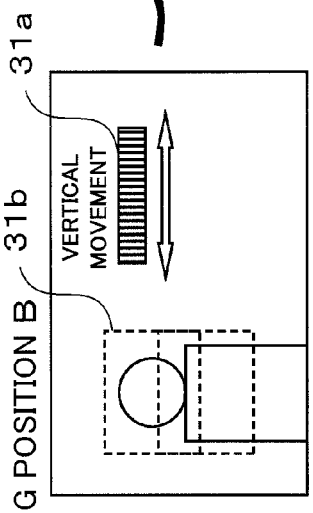
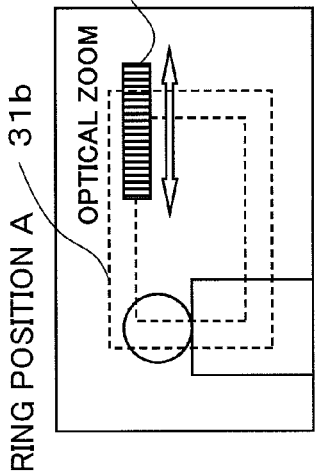
FIG. 14A
FIG. 14B
FIG. 14C
FIG. 14D

IMAGING SYSTEM AND CONTROL METHOD FOR IMAGING SYSTEM

CROSS-REFERENCE TO RELATED APPLICATION

This application is a continuation of U.S. patent application Ser. No. 13/670,616 (referred to as "the '616 application" and incorporated herein by reference), titled "IMAGING SYSTEM AND CONTROL METHOD FOR IMAGING SYSTEM," filed on Nov. 7, 2012, and listing Masaomi TOMIZAWA and Osamu NONAKA as inventors, the '616 application being based upon and claiming the benefit of priority from Japanese Patent Application No. 2011-243150 filed in Japan on Nov. 7, 2011, which is hereby incorporated by reference as if fully set fourth herein.

BACKGROUND OF THE INVENTION

1. Field of the Invention

The present invention relates to an imaging system that is capable of carrying out association of function of an operation section provided on a lens barrel, at a camera body side, and to a control method for the imaging system.

2. Description of the Related Art

An imaging system has been proposed having an operating ring arranged on a lens barrel housing a photographing lens, and is capable of carrying manual focus and setting of parameters for control using this operating ring. For example, in the image processing device disclosed in Japanese patent laid-open No. 2011-114662 (laid open Jun. 9, 2011), setting of a parameter setting corresponding to a photographed scene from among adjustment parameters for adjusting white balance and brightness etc. using an operating ring provided on a lens barrel is disclosed.

SUMMARY OF THE INVENTION

The present invention has as its object to provide an imaging system that is capable of carrying out association of operation members provided on the lens barrel with arbitrary functions from the body side, and a control method for the imaging system.

An imaging system of the present invention comprises a lens unit having a lens barrel section that contains a photographing optical system, and an operating section provided on the lens barrel section, and a camera body having an imaging section for converting a subject image formed by the photographing optical system into electrical signals, and a display section for displaying the subject image based on the electrical signals, wherein the lens unit has a transmission section for transmitting information relating to the operation section, and the camera body has a receiving section for receiving information relating to the operating section that has been transmitted from the transmission section, and an association section for displaying the information relating to the operation section that has been received by the receiving section on the display section, and associating information relating to the operating section with functions of the camera body.

An imaging system of the present invention comprises a lens barrel section having a photographing optical system and an operating section, an imaging section for converting a subject image formed by the photographing optical system into electrical signals, an operating section provided on the lens barrel section, and an associating section provided on a camera body having the imaging section, for displaying information relating to the operating section on a display section, and selecting information relating to the operating section from among various functions.

Also, a control method for the imaging system of the present invention comprises an input step for inputting information relating to an operating section provided on a lens barrel section, a display step of displaying information relating to the operating section and information relating to functions of the camera body and/or a lens unit, a determination step of determining whether or not association of information relating to the functions has been carried out, and an associating step of carrying out association in accordance with a result of the termination.

BRIEF DESCRIPTION OF THE DRAWINGS

FIG. 8A and FIG. 8B are drawings showing signal exchange between the camera body and the lens of one embodiment of the present invention.

FIG. 14A-FIG. 14D are drawings showing display at the camera body side in the case where trimming mode has been selected, for a modified example of the imaging system of the one embodiment of the present invention.

DETAILED DESCRIPTION OF THE PREFERRED EMBODIMENTS

Preferred embodiments using an imaging system, made up of a camera body and a lens unit, to which the present invention has been applied will be described in the following in accordance with the drawings. A camera of one preferred embodiment of the present invention is a digital camera, and has an imaging section, with a subject image being converted to image data by this imaging section, and the subject image then being subjected to live view display on a display section arranged on a rear surface of a body or in an ocular viewfinder etc. using image data based on this converted image data. A photographer determines composition and photo opportunity by looking at the live view display. At the time of a release operation image data is stored in a storage medium. Also, image data that has been stored in the storage medium can be played back and displayed on the display section if playback mode is selected.

Also, an operating section capable of rotating around the lens barrel is provided on the lens unit. If the lens unit is attached to the camera body, communication takes place between the camera body and the lens unit, and information relating to the operating section is transmitted from the lens unit. If the camera body receives information relating to the operating section, the information relating to the operating section is displayed on the display section, so that associating of the information relating to the operating section with functions of either the camera body or the interchangeable lens can be carried out on the display section. For example, it is possible for operating sections on the lens barrel side to be associated with operating sections for manual focus, to be associated with zooming operating sections, or to be associated with change operating sections for various modes such as exposure compensation, strobe mode etc.

Figure 1A:
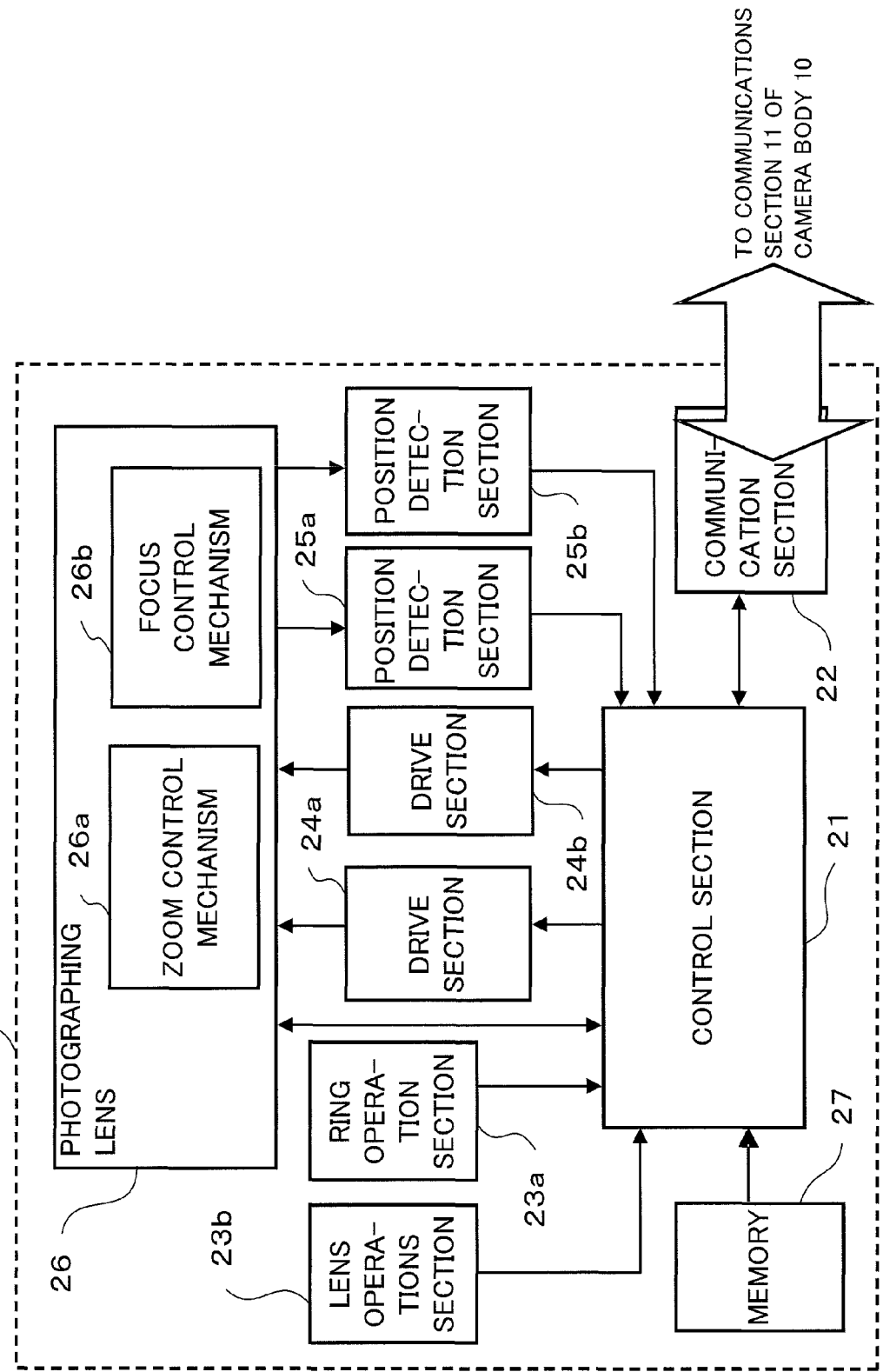
FIG. 1A and FIG. 1B are block diagrams mainly showing the electrical structure of an imaging system of one embodiment of the present invention.
Figure 1B:
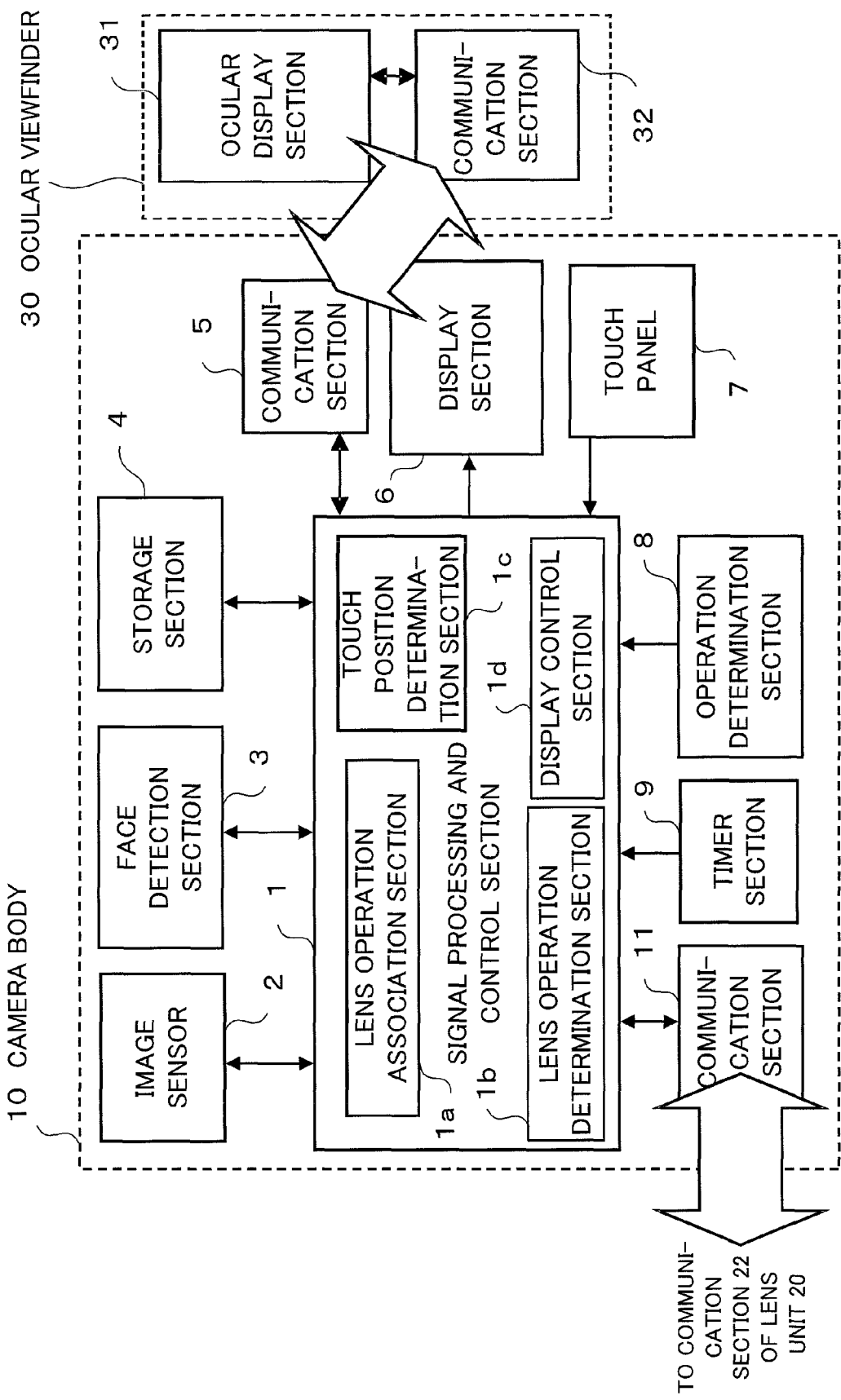

FIG. 1A and FIG. 1B is a block diagram showing the structure of an imaging system of one embodiment of the present invention, and the system comprises a camera body 10, a lens unit 20, and an ocular viewfinder 30. The lens unit 20 is removably attached to the camera body 10 by means of a bayonet mount. Also, the ocular viewfinder 30 can be attached to the camera body 10 by means of an adapter etc.

The imaging system of this embodiment is a so-called interchangeable lens camera, in which the camera body 10, lens unit 20, and ocular viewfinder 30 are separately constructed, but it is also possible to have an integrally formed camera such as a so-called compact camera, or to have a camera where the camera body 10 and the ocular viewfinder 30 are integrally formed such as a so-called single lens reflex camera.

A control section 21, communication section 22, ring operating section 23a, lens operating section 23b, drive sections 24a, 24b, position detection sections 25a, 25b, lens 26 and memory 27 are contained within the lens unit 20. This lens unit 20 corresponds to a lens unit having a barrel section containing a photographing optical system, and an operating section provided on this barrel section.

The control section 21 has a controller such as a CPU (Central Processing Unit), and performs control within the lens unit 20 in accordance with programs stored in the memory 27. Specifically, the control section 21 performs communication with a signal processing and control section 1 within the camera body 10 by means of the communication section 22, and transmits various information in response to requests from the signal processing and control section 1 within the camera body 10. Also, the control section 21 executes operations such as focusing of the photographing lens 10 in accordance with instructions from the signals processing and control section 1. In cases such as where the ring operating section 23a has been assigned to zooming operations or manual focus operations, zooming operations or manual focus operations are executed in accordance with operation of the ring operating section 23a.

The communication section 22 carries out communication with the communication section 11 within the camera body 10. As described previously, when request signals have been received from the camera body 10, lens state signals are transmitted in accordance with request signals by means of the communication section 22. Details of this communication will be described later using FIG. 8A, FIG. 8B and FIG. 9. The communication section 22 fulfills a function as a transmission section for transmitting information relating to operating sections of the lens unit 20. This transmission section is also capable of transmitting information other than operating states relating to the operating sections to the camera body 10. As information other than operating states relating to the operating sections, there is for example information representing at least one of focus position and focus length of the photographing lens 26.

The ring operating section 23a is attached so as to be capable of rotation around the lens barrel of the lens unit 20, and outputs signals generated in response to rotation to the control section 21. The control section 21 detects rotation direction and rotation amount and rotational speed etc. based on the pulse signals, and transmits control signals in accordance with the rotational state or transmits signals representing the rotational state, to the camera body 10 by means of the communication section 22. In one embodiment of the present invention, the ring operating section 23a does not slide backwards and forwards in the optical axis direction, but in a modified example of the 1 embodiments that will be described later, a slide operation backwards and forwards in the optical axis direction is possible.

The lens operating section 23b is an operating section provided on the lens unit 20 besides the ring operating section 23a, and is, for example, a push switch for changing mode. Also, in the modified example of the one embodiment that will be described later, it is a slide operation section for causing the ring operating section 23a to slide in the optical axis direction. The ring operating section 23a and the lens operating section 23b fulfill a function as operating sections provided on the barrel section.

The drive sections 24a, 24b are drive sections for a zoom control mechanism 26a and a focus control mechanism 26b within the photographing lens 26. A lens within the photographing lens 26 is driven based on control signals from the control section 21. The position detection sections 25a, 25b have encoders, detect focus position and focal length (zoom position) of the photographing lens 26, and output detection results to the control section 21.

The photographing lens 26 has a photographing optical system made up of a plurality of optical lenses for forming a subject image, and in this embodiment the photographing optical system is constituted by a zoom lens optical system. The zoom control mechanism 26a and the focus control mechanism 26b are provided within the photographic lens 26, and the drive sections 24a, 24b perform focus position adjustment (focus adjustment) and focal length adjustment (zoom adjustment) for the photographing lens 26. Also, although not shown in the drawings, an aperture mechanism is also provided, and control of aperture opening diameter is carried out based on control signals from the control section 21.

The memory 27 is constituted by a non-volatile memory such as flash memory, and as described previously stores programs for control. The memory 27 also stores an image of the operating section 23 used when carrying out lens association, which will be described later. This image is used as an operating section image 6L shown in FIG. 2B, as will be described later. The memory 27 also stores various data such as focal length at the long focus end, focal length at the short focus end, maximum aperture diameter, and optical characteristics for the photographing lens 26. These items of data are transmitted to the camera body 10 at the time of attaching the lens unit 20 to the camera body 10, or in response to request signals from the camera body 10.

A signal processing and control section 1, image sensor 2, face detection section 3, storage section 4, communication section 5, display section 6, touch panel 7, operation determination section 8, clock (timer) section 9, and communication section 11 are arranged inside the camera body 10.

The signal processing and control section 1 performs overall control of the control section 1 and the imaging system in accordance with programs stored in a memory, not shown.

A lens operation association section 1a, a lens operation determination section 1b, a touch position determination section 1c and a display control section 1d are provided within the signal processing and control section 1. The lens operation association section 1a carries out processing to associate functions of the ring operating section 23a of the lens unit 20 side in the camera body 10. The lens operation association section 1a carries out assigning all functions of the operation sections in accordance with the users intentions, such as, for example, carrying out a zooming operation, carrying out a manual focus operation, or carrying out mode processing, in response to a rotation operation of the ring operating section 23a. This specific operation will be described later using FIG. 2A-FIG. 2D.

The lens operation determination section 1b is input with information relating to operation of the ring operating section 23a of the lens unit 20 by means of the communication section 22 and the communication section 11, and determines operating state. For example, the lens operation determination section 1b is input with information relating to rotation direction and rotation amount of the ring operating section 23a, and carries out determination of the operating state. If the ring operating section 23a has been associated with mode processing by the lens operation association section 1a, update of parameters for mode processing is carried out in accordance with rotation direction and rotation amount of the ring operating section 23a that have been determined by the lens operation determination section 1b.

The touch position determination section 1c is input with detection signals from the touch panel 7, which will be described later, and determines at what position on the screen of the display section 6 the user has touched. As will be described later using FIG. 2A-FIG. 2D, a lens operation association operation carries out setting according to the touch position by the user on the display section 6.

The display control section 1d carries out control for display on the display section 6. This display control section 1d carries out various display controls, but one of them is display control at the time of a lens operation association operation. Specifically, when an image representing the operating section has been transmitted from the lens unit 20, an icon for previously prepared function, for example, zooming, manual focus, or mode processing, is displayed on the display section 6 together with the image of the operating section.

The lens operation association section 1a, lens operation determination section 1b, touch position determination section 1c and a display control section 1d etc. within the signal processing and control section 1 function as an associating section. This associating section displays information relating to the operating sections within the lens unit 20 that has been received by means of the communication section 11 functioning as a receiving section on the display section 6, and it carries out association of the information relating to the operating sections and functions of the camera body. Also, the associating section displays information relating to operating sections within the lens unit and functions of the camera body, detects an association operation carried out by the user and performs associating based on the detection results. The association operation carried out by the user is determined based on detection signals from the touch panel 7.

The image sensor 2 is a solid-state image sensor such as a CCD image sensor or a CMOS image sensor, and is arranged on the optical axis of the photographing lens 26 close to a position where a subject image is formed by the photographing lens. This image sensor 2 converts the subject image to an image signal. This image signal is output to the signal processing and control section 1 after being A/D converted to digital image data. The previously described photographing lens 26 and the image sensor 2 fulfill a function as an imaging section for converting a subject image formed by the photographing optical system into an electrical signal.

The face detection section 3 is input with image data of the subject image and detects the face of a person etc. It is also possible to focus on a face that has been detected by this face detection section 3. A focus detection circuit has been omitted from FIG. 1A and FIG. 1B, but it is possible to a suitably adopt well-known contrast AF where a contrast signal is obtained from image data and the photographing lens 26 is controlled so that this contrast value becomes a peak, or well-known phase difference AF where a defocus amount is obtained from a phase difference and the photographing lens 26 is controlled.

The storage section 4 is a storage medium such as flash memory, and stores still image data or movie data for storage based on image data from the image sensor 2. If playback mode is selected, image data that has been stored in the storage section 4 is read out, and the stored image is subjected to playback display on the display section 6.

The communication section 5 performs communication with the ocular viewfinder 30, which will be described later. With this embodiment, as described previously, the ocular viewfinder 30 can be attached to the camera body 10, and at the time of attachment, or when request signals are output from the signal processing and control section 1, communication is carried out with the communication section 32 within the ocular viewfinder 30.

The display section 6 has a display such as an LCD (liquid crystal display) or organic EL arranged on a rear surface or the like of the camera body 10. The display section 6 performs live view based on image data from the image sensor 2, or displays an image that has been stored in the storage section 4 at the time of playback. Also, at the time of the lens operation association, display of icons representing the operation section (in this embodiment the ring operating section 23a) and functions of the lens unit 20 is carried out. The display section 6 may fulfill a function as a display section for displaying a subject image based on an electrical signal from the imaging section.

The touch panel 7 is integrally formed with the front surface of the display section 6 or with the display section 6, and outputs a detection signal corresponding to a position on the display section 6 that has been touched by the user to the signal processing and control section 1. The touch panel 7 is capable of carrying out touch input on a screen for various camera settings. Also, as will be described later using FIG. 2B-FIG. 2D, at the time of lens operation association an image of the operating section of the lens unit 20 and icons representing functions are used as input when the user performs association.

The operation determination section 8 determines operating states of various operating members of the camera body 10, such as a power supply button, release button, playback button, menu button etc. The signal processing and control section 1 executes various control based on operating states of the operating members determined by the operation determination section 8.

The clock (timer) section 9 has a clock function, and acquires time and date information such as the time of shooting, and fulfills a clock function at the time of a control operation by the signal processing and control section 1. The communication section 11 carries out communication with the lens unit 20, as was described previously. This communication section 11 fulfills a function as a receiving section for receiving information relating to operating section that has been transmitted from the lens unit.

An eyepiece display section 31 and a communication section 32 are arranged in the ocular viewfinder 30. The communication section 32 carries out communication with the communication section 5 at the camera body 10 side. The eyepiece display section 31 is an electronic viewfinder, and displays an image that has been input by means of the communication section 5 and the communication section 32. For example live view display is carried out based on image data from the image sensor 2. The eyepiece display section 31 may also fulfill a function as a display section for displaying a subject image based on an electrical signal from the imaging section.

Figure 2A:
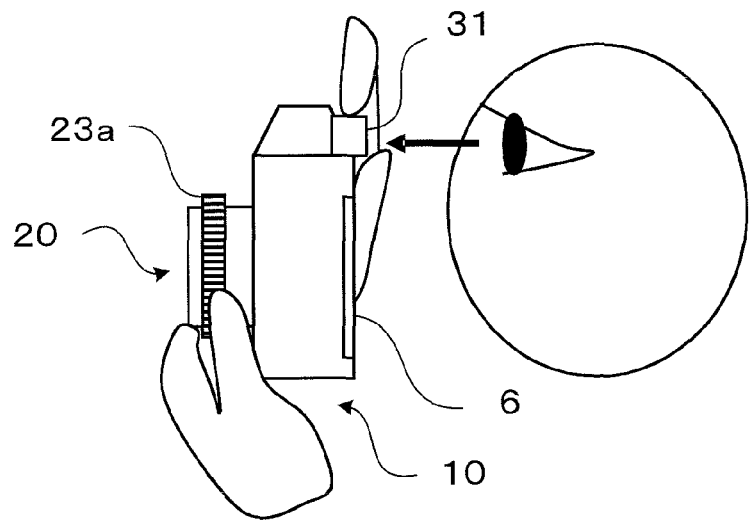
FIG. 2A-FIG. 2D are drawings for describing usage states of the imaging system of one embodiment of the present invention.
Figure 2B:
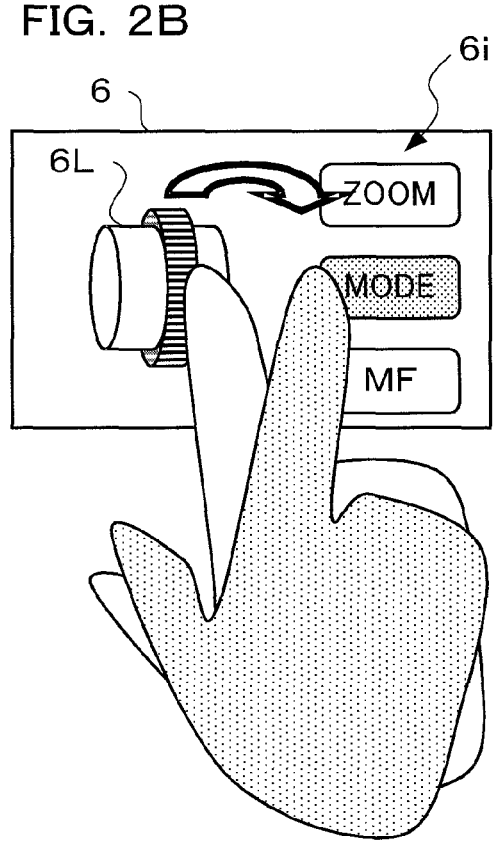

Next, lens operation association processing will be described using FIG. 2A-FIG. 2D. FIG. 2A shows the appearance of attaching a lens unit 20 and ocular viewfinder 30 to the camera body 10, and a user looking through the ocular viewfinder 30 while holding the camera. At this time, the user's right hand is concentrating on operation of the release button arranged on an upper surface of the camera body 10, while the left hand is concentrating on operating the ring operating section 23a to carry out the focus while supporting the lens unit 20.

This method of holding the camera shown in FIG. 2A is logical from the point of view of determining composition and photo opportunity, but the operation and adjustment the user wants to carry out is not necessarily focusing. With this embodiment therefore, it is possible to associate the ring operating section 23a of the lens unit 20 at the camera body 10 side so that it can also be used in adjustment of other functions.

Association at the camera body 10 side is carried out by the display control section 1d displaying an operating section image 6L representing the ring operating section 23a at the lens unit 20 side and icons 6i representing functions to be associated with the ring operating section 23a (in FIG. 2B there are three icons, namely "zoom" and "MF", which are lens unit 20 side functions, and "mode" which is a camera body 10 side function) on the display section 6, and the user then carrying out designation of a function they want to associate with the operating section 23a (being displayed by the icons 6i) on the screen of the display section 6.

As a method of designating the association on the screen, first the user touches the operating section icon 6L, and then slides to the icon representing the function they want to associate ("mode" in FIG. 2B) while still touching the screen. At this time, the lens operation association section 1a sets the function of the ring operating section 23a in accordance with the designation based on determination results from the touch position determination section 1c. The example shown in FIG. 2B, "mode" is set.

Figure 2C:
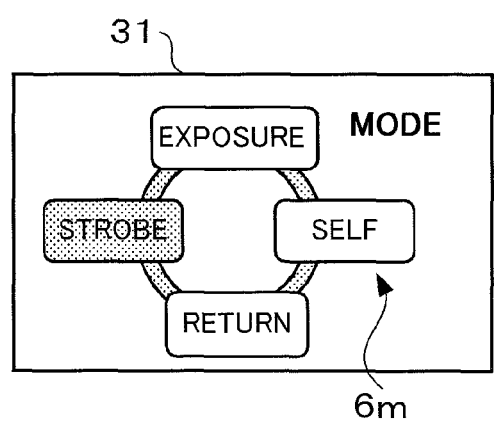

If "mode" has been set as the function of the ring operating section 23a, the display control section 1d displays modes 6m that are subordinate to "mode" on the eyepiece display section 31. When the subordinate modes 6m are displayed, if the user peers into the ocular viewfinder 30 a screen as shown in FIG. 2C, namely "exposure", "strobe", and "self timer" etc., which are subordinate modes to "mode" is displayed. If a subject image can be seen during display of the subordinate modes it will be confusing, and so at this time live view display is turned off.

In this state, if the user carries out a rotation operation of the ring operating section 23a the lens operation determination section 1b determines operating state, and based on the results of this determination the display control section 1d causes the selected subordinate mode 6m to sequentially move in the rotation direction. With the example shown in FIG. 2B, the subordinate mode currently being selected is easily made visible by changing the color, for example, but this is not limited and it is also possible to identify that an item is being selected using a method such as flashing.

As a method of confirming the subordinate mode being selected, in this embodiment a release button is pressed down. As described previously, since the appearance of a subject image during display of the subordinate modes is confusing, live view display is turned off, and since the user is therefore unlikely to operate the release button by mistake in order to take a picture, the release button is used to confirm the subordinate mode. As well as this method, it is also possible, for example, to carry out confirmation by keeping any subordinate mode selected for a specified time, or by operation of another operation member such as the OK button.

Figure 2D:
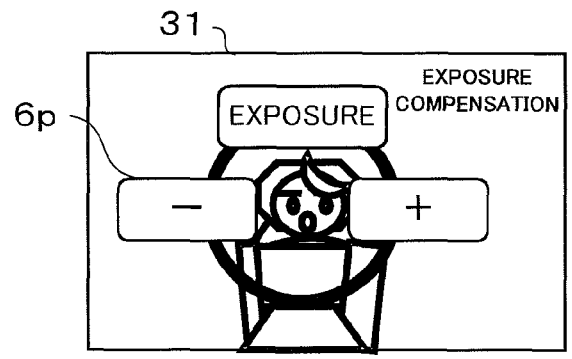

On the screen shown in FIG. 2C, if selection of a subordinate mode is confirmed, switching of a parameter determined depending on the subordinate mode is carried out next. The example shown in FIG. 2D shows the appearance when exposure is confirmed as the subordinate mode, and the display control section 1d displays a screen for carrying out parameter adjustment for exposure compensation on the eyepiece display section 31. If the ring operating section 23a is rotated in this state, the rotation is detected by the lens operation determination section 1b, and it is possible to display changes in exposure compensation value on a parameter display 6p based on the detection results. At the time of this parameter display for exposure compensation, live view display is restarted and it is possible to adjust the parameters for exposure compensation while viewing the appearance of the subject.

If the association of FIG. 2A-FIG. 2D is carried out, the function that has been associated with the operating section image 6L is transmitted from the camera body 10 to the lens unit 20 as an association result. In the case where the associated function is a function of the camera body 10, the camera body 10 operates based on the set mode and parameters. In the case where the associated function is a function of the lens unit 20, the lens unit 20 is operated based on the set mode.

Next, operation of the one embodiment of the present invention will be described using the flowcharts shown in FIG. 3 to FIG. 7. This operation is executed by the signal processing and control section 1 in accordance with programs stored in a memory, not shown, arranged in the camera body 10.

Figure 3:
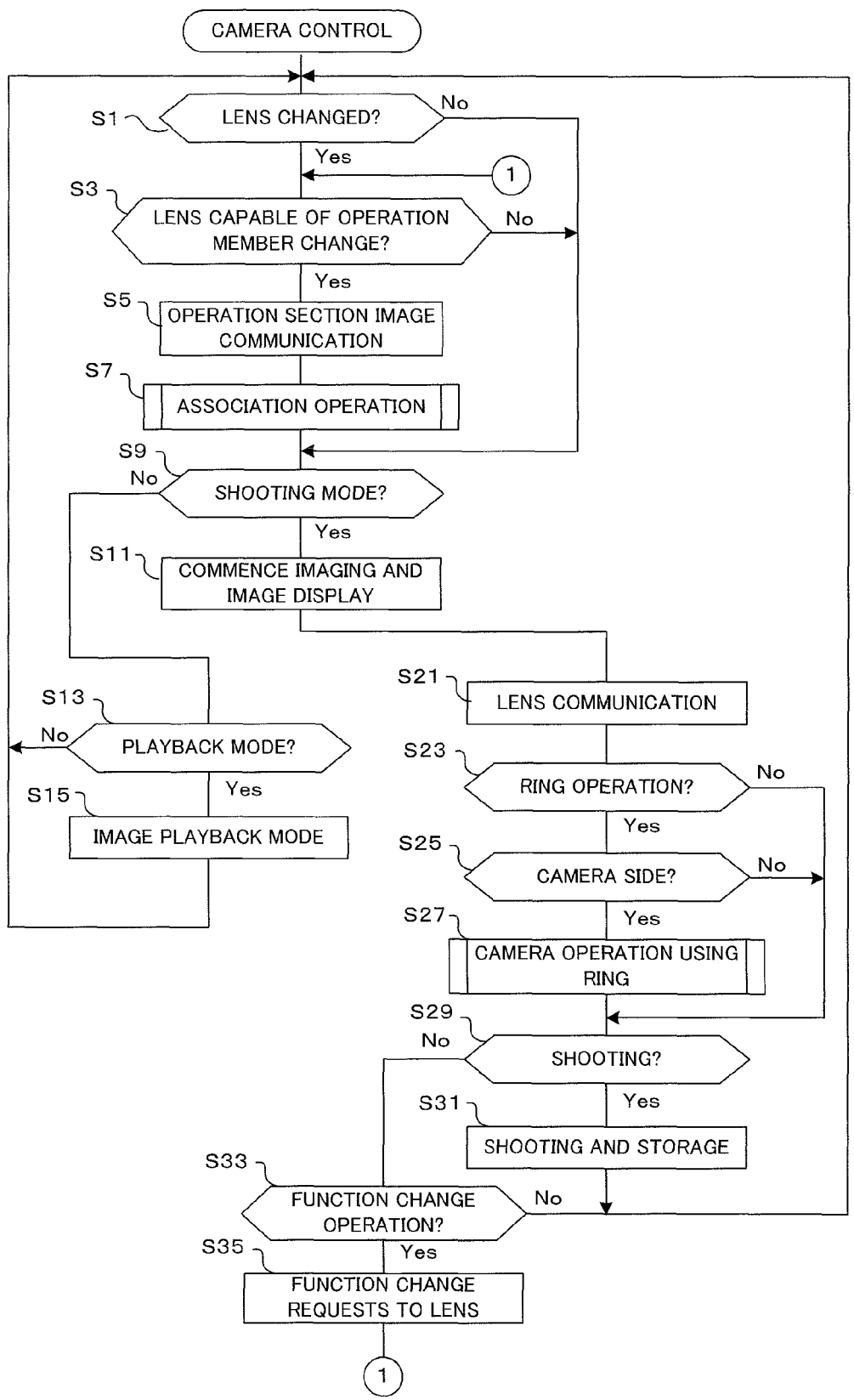
FIG. 3 is a flowchart showing operation of a camera body of the one embodiment of the present invention.

If the flow for camera control shown in FIG. 3 commences operation, it is first determined whether or not a lens has been changed (S1). Here, it is determined, based on detection results from a lens detection section or the like, not shown, whether or not a lens unit 20 has gone from a state of not being attached to the camera body 10 to an attached state.

If the result of determination in step S1 is that the lens has been changed, it is next determined whether or not it is a lens capable of operation member change (S3). Depending on the model of the interchangeable lens that has been fitted, there may be cases where it is not possible to change the function of the operating section such as the ring operating section 23a. In this step, therefore, communication is performed with the lens unit 20, and it is determined whether or not the lens is capable of operation member change.

If the result of determination in step S3 is that it is a lens capable of having the operation member changed, operation section image communication is next carried out (S5). If the lens unit 20 that has been fitted is capable of operation member change then the operating section image 6L representing the operating section is transmitted from the lens unit 20 to the camera body 10.

Once communication of the operating section image has been carried out an association operation is carried out (S7). Here, as was described using FIG. 2A-FIG. 2D, operation of the ring operations section 23a is associated with one of a plurality of functions. Details of this associating operation will be described later using FIG. 4.

Once the associating operation of step S7 is completed, or if the result of determination in step S1 was that there was no lens change, or if the result of determination in step S3 was that a lens capable of operation member change has not been fitted, it is next determined whether or not the mode is exposure (shooting) mode (S9). The camera of this embodiment can select shooting mode and playback mode, and shooting mode is set as the default mode.

If the result of determination in step S9 was that it is not shooting mode, it is next determined whether or not playback mode has been set (S13). Playback mode is set if a playback button, for example is operated, and playback mode is released if the play button is pressed again. If the result of this determination is that it is not playback mode, processing returns to previously described step S1.

If the result of determination in step S13 is that it is playback mode, image playback mode is executed (S15). Here, image data stored in the storage section 4 within the camera body 10 is read out, and playback display on the display section 6 is carried out. Once image playback has been carried out, processing returns to step S1.

If the result of determination in previously described step S11 is that it is shooting mode, then next imaging and image display are commenced (S11). Here, a subject image is subjected to photoelectric conversion in the image sensor 2 to acquire image data, and live view display on the display section 6 is commenced.

Once imaging and image display has started, then communication is next carried out (S21). Here, communication of various data and control signals is carried out by means of the communication section 11 within the camera body 10 and the communication section 22 within the lens unit 20. For example, various data such as focal length at the long focus end, focal length at the short focus end, maximum aperture diameter, optical characteristics etc. of the photographic lens 26, and an operation section image 6L of the operation section 23 used when carrying out lens association, are communicated. Details of the lens communication will be described later using FIG. 9.

Once lens communication has been carried out it is next determined whether or not there has been a ring operation (S23). Here, the lens operation determination section 1b carries out determination based on a signal representing operating state of the ring operating section 23a that has been input by means of the communication sections 11 and 22.

If the result of determination in step S23 is that there has been a ring operation, it is next determined whether or not processing at the camera side is required (S25). Among the functions that have been associated with the ring operating section 23a in step S7, there are functions processed at the lens unit 20 side, such as zooming or manual focus, or there are functions processed at the camera body 10, such as mode processing. In this step it is determined whether or not a function that has been associated is processed at the camera body 10 side.

If the result of determination in step S25 is that there is processing at the camera side, a camera operation using the ring is next carried out (S27). Here, as was described using FIG. 2C and FIG. 2D, setting of a subordinate mode and parameter adjustment etc. are carried out in accordance with the rotation operation of the ring operating section 23a. Detailed operation for a camera operation using this ring will be described later using FIG. 5.

Once the camera operation using the ring has been carried out in step S27, or if the result of determination in step S23 was that there has been no ring operation, or if the result of determination in step S25 was that processing for an associated function is not carried out at the camera side, it is next determined whether or not to take a picture (S29). Once the user has viewed a subject image displayed on the ocular viewfinder 30 or the display section 6 and determined composition etc. the release button is pressed down fully. Determination in this step is carried out based on whether or not the release button has been pressed down fully.

If the result of determination in step S29 is that a picture is to be taken, shooting and storage are carried out (S31). Here, after image data from the image sensor 2 has been subjected to image processing by the image processing and control section 1, image data is stored in the storage section 4. Once the shooting and storage have been carried out, processing returns to step S1.

If the result of determination in step S29 is that a photograph is not to be taken, it is determined whether or not there has been a function change operation (S33). If an operating member of the camera body 10, for example a help button etc., is operated, or if a function change operation is carried out on a menu screen or the like, a function change for the ring operating section 23a is carried out. In this step it is therefore determined whether or not these function change operations have been performed. If the result of this determination is that there has not been a function change operation, processing returns to step S1.

If the result of determination in step S33 is that a function change operation was performed, a function change request is next carried out to the lens (S35). Here, the function change request is transmitted by means of communication with the lens unit 20. After this processing advances to step S3, and in previously described steps S3-S7 association of the ring operating section 23a and the function is carried out.

In this way, in the camera control flow, at the time of changing a lens or when a function change operation has been performed, one function from among the plurality of functions is selected and associated with the ring operating section 23a of the lens unit 20 (S1-S7, S33, S35). Also, when an associated function carries out processing at the camera body 10 side, the camera body 10 executes processing in accordance with operation of the ring operating section 23a.

Next, detailed operation of the associating operation in step S7 will be described using FIG. 4. If the associating operation flow is entered, it is first determined whether or not an image has been received (S41). As described previously, since operation section image communication is carried out in step S5, in this step it is determined whether or not this operation section image has been received. Depending on the lens unit 20, there may be cases where it does not have an associated function, and the operation section image is not transmitted. In this step in this receipt is therefore confirmed.

If the result of determination in step S41 is that the image has been received, lens image display is carried out (S43) and the icon is determined in accordance with the lens and displayed (S45). Here, as was described using FIG. 2B, an operating section image 6L and icons 6i are displayed on the display section 6. The operation section image 6L is the image that was transmitted from the lens unit 20, and the icons 6i are determined depending on the functions of the camera body 10 and the lens unit 20. Details of the display method for the operation section image 6L and the icons 6i will be described later using FIG. 10A and FIG. 10B. The icons 6i are displayed in a uniform manner, and it is also possible to make functions that cannot be executed, depending on the function of the camera body 10 and the lens unit 20, unselectable.

Next, it is determined whether or not a slide has been detected (S47). As has been described using FIG. 2B, in the case where the user has associated a function with the ring operating section 23a, after touching the operating image 6L a slide operation is carried out to the icon 6i they wish to associate. In this step the touch position determination section 1c determines whether or not there has been a slide operation based on a detection signal from the touch panel 7.

If the result of determination in step S47 is that there is no slide detection, it is determined whether or not a specified time has elapsed (S57), and if the specified time has not elapsed processing returns to step S47. Here, a standby state is entered during the time taken for the user to perform the slide operation.

If the result of determination in step S47 is that there is slide detection, it is next determined whether the slide stop point or endpoint is the operating section image (S49). Here, the touch position determination section 1c detects the position of the slide start point or the slide end point, and it is determined whether or not this position is on or in the vicinity of the operation section image 6L.

If the result of determination in step S49 is that the slide stop point or endpoint is the operating section image, it is next determined whether the slide start point or endpoint is an icon part (S51). Here, the touch position determination section 1c detects the position of the slide start point or the slide end point, and it is determined whether this position is one of the plurality of icons 6i, or in the vicinity thereof.

If the result of determination in step S51 is that the slide start point and end point are at an icon portion, next the operation section and an icon function are associated. Here, the ring operating section 23a corresponding to the operation section image 6L is associated with a function corresponding to the icon 6i at the slide point. With the example shown in FIG. 2B, the function of the ring operating section 23a is associated with mode setting.

Once the association has been carried out in step S53, association information is next transmitted (S55). Here, the result of the association that was carried out in step S53 is transmitted from the camera body 10 to the lens unit 20 side by means of the communication section 11. In the case where "mode" has been set as an association, the lens unit 20 side transmits only operating state of the ring operating section 23a to the camera body 10. However, in the case where zoom or manual focus has been set, the control section 21 of the lens unit 20 executes zooming or manual focus in accordance with the operating state of the ring operating section 23a.

Next, if the result of determination in step S57 is that the specified time has elapsed, or if the result of determination in step S49 is that the slide start point and end point are not at an operation section image, or if the result. of determination in step S51 is that the slide start point and end point are not at an icon portion, it is next determined whether or not an association has already been performed. It is determined whether or not an association was already performed in step S53.

If the result of determination in step S59 is that an association has already been performed, the previous association is maintained (S61). On the other hand, if the result of determination in step S59 is that an association has not yet been performed, or if the result of determination in step S41 is that an image has not been received, a default association is carried out (S63). It is possible to determine suitable design values as a default.

Once the default association has been carried out in step S63, or if the previous association has been maintained in step S61, or if transmission of the association information has been carried out in step S55, the original flow is returned to.

In this manner, with the associating operation, as was described previously using FIG. 2, one function from among the plurality of function represented by the icons 6i is selected in accordance with the user's slide operation, and associated with the ring operating section 23a.

Figure 5:
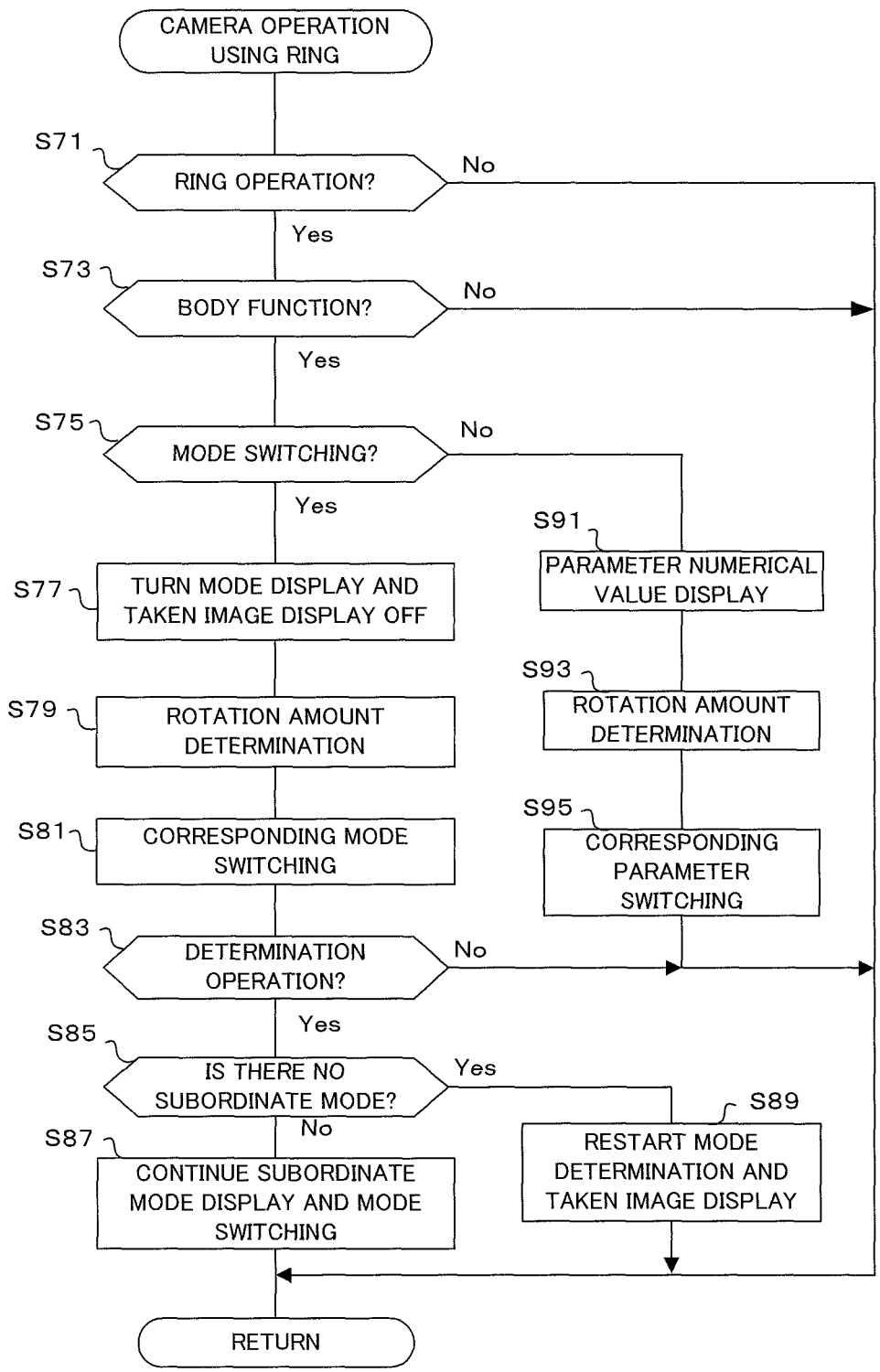
FIG. 5 is a flowchart showing operation, using a ring, of the camera body of the one embodiment of the present invention.

Next, camera operation using the ring in step S27 (refer to FIG. 3) will be described using FIG. 5. With this camera operation using the ring, as described previously, in the case where the function that has been associated is processed in the camera body 10, setting of a subordinate mode and parameter adjustment etc. is carried out in accordance with the rotation operation of the ring operating section 23a.

If the flow for camera operation using the ring is entered, it is first determined whether or not there has been ring operation (S71). Here, the lens operation determination section 1b carries out determination based on a signal representing operating state of the ring operating section 23a that has been input by means of the communication sections 11 and 22.

If the result of determination in step S71 is that there has been a ring operation, it is determined whether or not it is a body function (S73). Here, it is determined whether or not the function of the ring operating section 23a that was associated in step S53 is a camera body 10 side function.

If the result of determination in step S73 is that it is a body function, it is next determined whether or not there is mode switching (S75). If there is mode switching, as was described using FIG. 2, since subordinate mode setting is carried out, in this step it is determined whether or not there is mode switching of the function that has been associated.

If the result of determination in step S75 is that there is mode switching, then next mode display is carried out together with removing a taken image (S77). Here, as shown in FIG. 2C, "strobe", "exposure" and "self" are displayed on the eyepiece display section 31, and based on image data from the image sensor 2 live view display is turned off.

Next, rotation amount determination is carried out (S79). Here, the lens operation determination section 1b determines rotation direction and rotation amount of the ring operating section 23a based on signals from the lens unit 20.

Once rotation amount determination has been carried out, corresponding mode switching is carried out (S81). Here, corresponding mode switching is carried out in accordance with rotation direction and rotation amount of the ring operating section 23a that were determined in step S79. In the example shown in FIG. 2C, if the ring operating section 23a is rotated in a clockwise direction the corresponding mode is switched sequentially in the order "strobe"→"exposure"→"self"→"return"→"strobe". "return" is an icon for completing subordinate mode setting.

Once corresponding mode switching has been carried out, it is next determined whether or not a determined operation has been carried out (S83). As was described previously, with this embodiment a determination operation of a subordinate mode is carried out using operation of the release button, and so in this step determination is based on the operating state of the release button.

If the result of determination in step S83 is that there has been a determination operation, it is next determined whether or not there is a subordinate mode (S85). If exposure has been selected as the subordinate mode in step S83, there is no subordinate mode. However depending on the selected subordinate mode, there may be further subordinate modes. It is therefore determined in this step whether or not there is a further subordinate mode. As subordinate modes, for example, a zoom operation has optical zoom or electronic zoom, and focus has course adjustment and fine adjustment. For mode selection also, subordinate to an art filter mode, what image processing is selected, and to what extent the processing is performed and whether or not there is blending etc. can also be considered. Further, in a case such as where strobe mode has been selected from a menu, there is switching of flash OFF, assist flash, self-timer duration etc. At the time of multi-recording, it is also possible to make setting of a number of sub-images etc. possible in a subordinate mode.

If the result of determination in step S85 is that there are further subordinate modes, the subordinate modes are displayed and mode switching continues (S87). On the other hand, if the result of determination is that there are no further subordinate modes, the mode is determined, and display of a taken image is recommenced (S89). Here, together with determining the mode, live view display is recommenced based on image data from the image sensor 2.

If the result of determination in step S75 is that there is no mode switching, parameter numerical value display is carried out (S91). Here, it is a case where there is no further mode switching, for instance, a case where "exposure", which is a subordinate mode to mode switching, has been determined, as shown in FIG. 2D. In this case, in steps S91-S95 parameter adjustment is carried out in accordance with a rotation operation of the ring operating section 23a. In this step S91, display of parameter numerical values for carrying out parameter adjustment are displayed. Also, at this time, since live view display is being performed, it is possible for the user to carry out parameter adjustment while looking at the subject.

Once parameter numerical value display has been carried out, next, similar to step S79, rotation amount determination is carried out (S93). Here, the lens operation determination section 1b determines rotation direction and rotation amount of the ring operating section 23a based on signals from the lens unit 20. Once rotation amount determination has been carried out, switching of corresponding parameters is next carried out (S95). Here, switching of parameter numerical values is carried out in accordance with rotation amount that was determined in step S93.

Once the corresponding parameter switching of step S95 has been carried out, or if the result of determination in step S71 is that a ring operation has not been performed, or if the result of determination in step S73 is that it is not a body function, or if the result of determination in step S83 is that a determination operation has not been carried out, or if mode switching continuation has been carried out in step S87, or if live view display has been recommenced in step S89, the original processing flow is returned to.

In this way, with the flow for camera operation using the ring, switching of modes and switching of parameter numerical values is carried out in accordance with the ring operation.

Next, processing at the lens unit 20 side will be described using the flowcharts shown in FIG. 6 and FIG. 7. These processing flows are executed by the control section 21 within the lens unit 20 in accordance with programs that have been stored in the memory 27.

Operating section image communication at the lens side will be described using FIG. 6. This operating image communication is processing flow executed by the control section 21 of the lens unit 20 in step S5 (refer to FIG. 3) at times such as when a transmission request for an operating section image has been transmitted from the camera body 10 side.

If the flow for lens side operating section image communication is entered, it is first determined whether or not a lens has been changed or if there is a change request (S101). Here it is determined whether or not the lens unit 20 has been attached to the camera body 10, or whether or not a request to transmit an operating section image has been received from the camera body 10 (refer to step S35 (FIG. 3)).

If the result of determination in step S101 is that there is a lens change or change request, it is next determined whether or not communication is possible (S103). Here, it is determined whether or not communication is possible with the camera body 10 by means of the communication sections 22 and 11.

If the result of determination in step S103 is that communication is possible, transmission of an operation section image is next carried out (S105). Here, an image of the ring operating section 23a stored in the memory 27 (corresponding to the operation section image 6L) is transmitted to the camera body 10.

Once the operations section image has been transmitted, is next determined whether or not association information has been received (S107). If the operating section and icon function are associated, then since association information is transmitted in step S55 (refer to FIG. 4), in this step it is determined whether or not this information has been received.

If the result of determination in step S107 is that association information has been received, operation section determination is next carried out from the association information (S109) and the operation section and the function are associated (S111). Here, association of the function that was designated by the user in step S53 (refer to FIG. 4) with the designated operation section (with this embodiment, the ring operating section 23a) is carried out from the received association information. In this way it is made possible, for example, to assign zooming and manual focus etc. as functions of the rings operating section 23a.

If association of the operation section and the function has been carried out in step S111, or if the result of determination in step S101 is that there was no lens change or update request, or if the result of determination in step S103 is that communication is not possible, or if the result of determination in step S107 is that association information was not received, the lens side operation section image communication is terminated and the original main flow is returned to.

In this way, with the flow for lens side operation section image communication, if an operation section image is transmitted and association information is received, association of a function with the operation section is carried out.

Next, the lens side communication will be described using the flowchart shown in FIG. 7. If the lens communication flow is entered, lens state is first determined (S121). Here, various lens states, such as lens position, aperture opening, rotational state of the ring operating section 23a etc. within the lens unit 20 are determined by the position detection sections 25a, 25b, ring operating section 23a, lens operating section 23b etc.

Once lens state has been determined, it is next determined whether or not there has been a lens control operation (S123). Here, it is determined whether or not there has been an operation to control the lens unit 20 by rotation of the ring operating section 23a, such as zooming or manual focus. In the event that, according to the association information, the ring operating section 23a is set to zooming or manual focus, the determination result becomes yes. If the result of determination in step S123 is that there is a lens control operation, lens control is carried out (S125). Here, an operation is carried out in accordance with the operating state of the ring operating section 23a.

Once lens control has been carried out in step S125, or if the result of determination in step S123 is that there was no lens control operation, it is next determined whether or not there is communication (S127). Since communication is carried out at the camera body 10 in step S21 (refer to FIG. 3), communication is also carried out at the lens unit 20 side in response to the communication request at this time.

If the result of determination in step S127 is that there is communication, lens state communication is carried out next (S129). Here, state of the lens unit 20 is transmitted in response to the request from the camera body 10. Once lens state communication has been carried out, lens control is carried out (S131). Here, in the case where an instruction related to lens control has been issued from the camera body 10 side by lens communication, control is carried out in accordance with the instruction. For example, in the case where an AF control instruction has been issued from the camera body 10, control such as focusing is carried out in accordance with the AF control instruction.

Once the lens control in step S131 has been carried out, or if the result of determination in step S127 is that communication is not carried out, the lens communication flow is terminated and the original main flow is returned to.

In this manner, with the lens communication, control is carried out in accordance with lens state, and if control signals are received from the camera body 10 control is carried out in accordance with the control signals.

Next, exchange of signals between the camera body 10 and the lens unit 20 will be described using FIG. 8A and FIG. 8B. FIG. 8A shows exchange of signals when a function is associated with the operating section. First, at time T1, if fitting of the lens unit 20 or a function change request are carried out at the camera body 10 (S1 in FIG. 3), at time T2 the lens unit 20 transmits an operating section image (lens image) (refer to S105 in FIG. 6). Once the camera body 10 has received the operating section image, the operating section image is displayed at time T3 (refer to S43 in FIG. 4).

Also, if the user performs the association operation as was described in FIG. 2A-FIG. 2D, first of all a touch signal 1, for a touch start point, is transmitted from the camera body 10 to the lens unit 20 at time T4, and a touch signal 2 for a touch end point is transmitted from the camera body 10 to the lens unit 20 at time T5. Here, transmission of the touch signals 1 and 2 to the lens unit 20 is in order to notify that there has been an association operation from the camera body 10 side to the lens unit 20 side. As a result, an operation in progress signal is transmitted to the lens unit 20 side control section 21, and it becomes possible to prevent unforeseen control etc. with the lens unit 20. It is an important signal from the point of view of preventing errors during operation.

Figure 4:
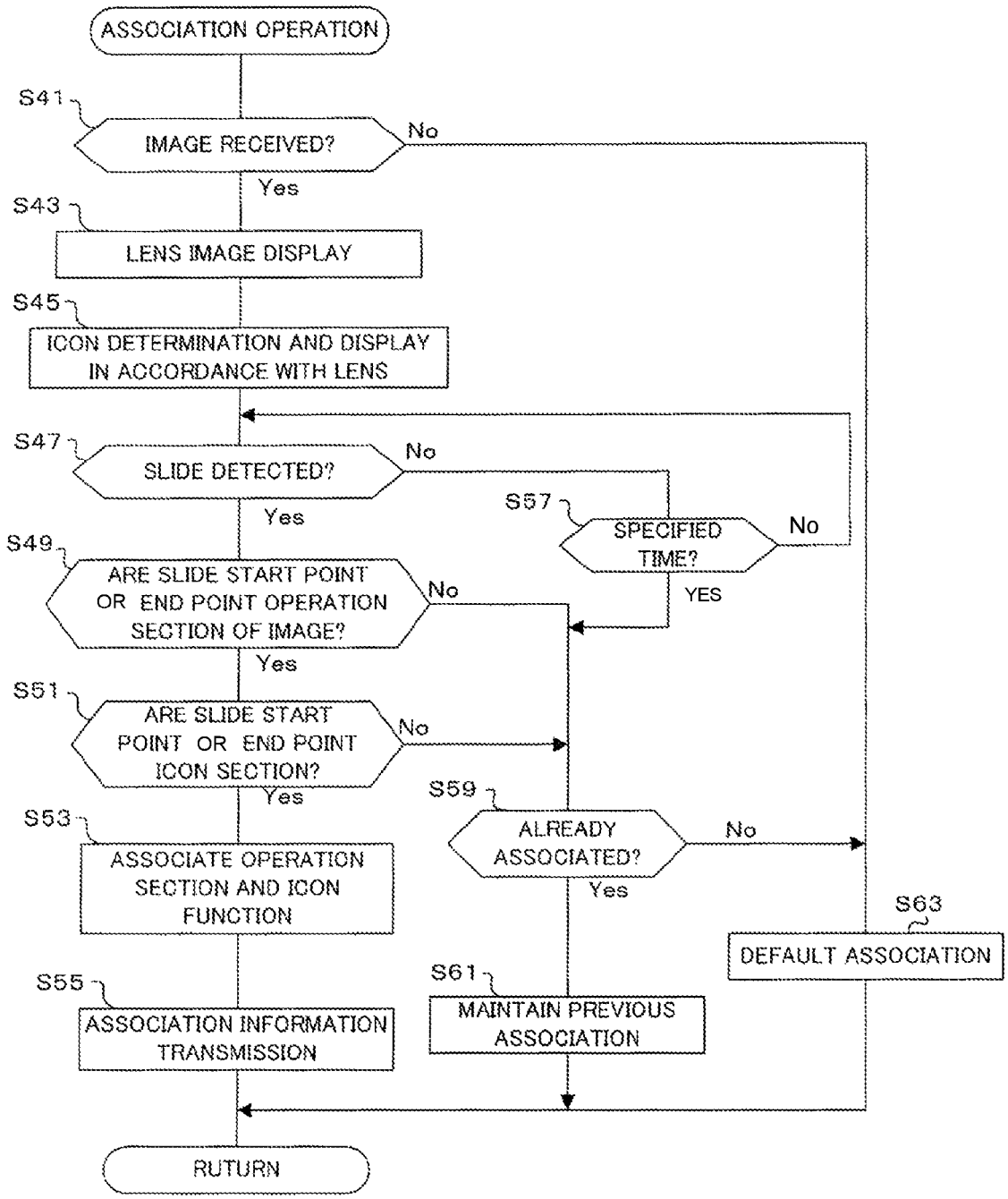
FIG. 4 is a flowchart showing operation of an associating operation of the camera body of the one embodiment of the present invention.
Figure 6:
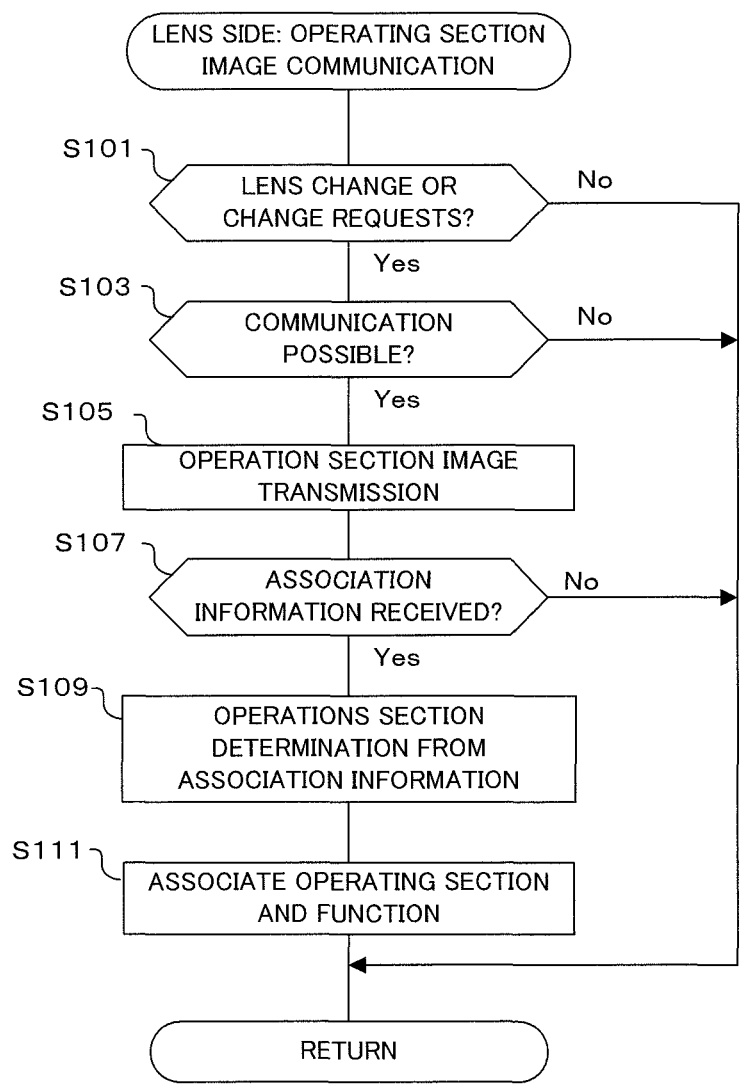
FIG. 6 is a flowchart showing operation of operation section image communication at a lens side of the first embodiment of the invention.
Figure 7:
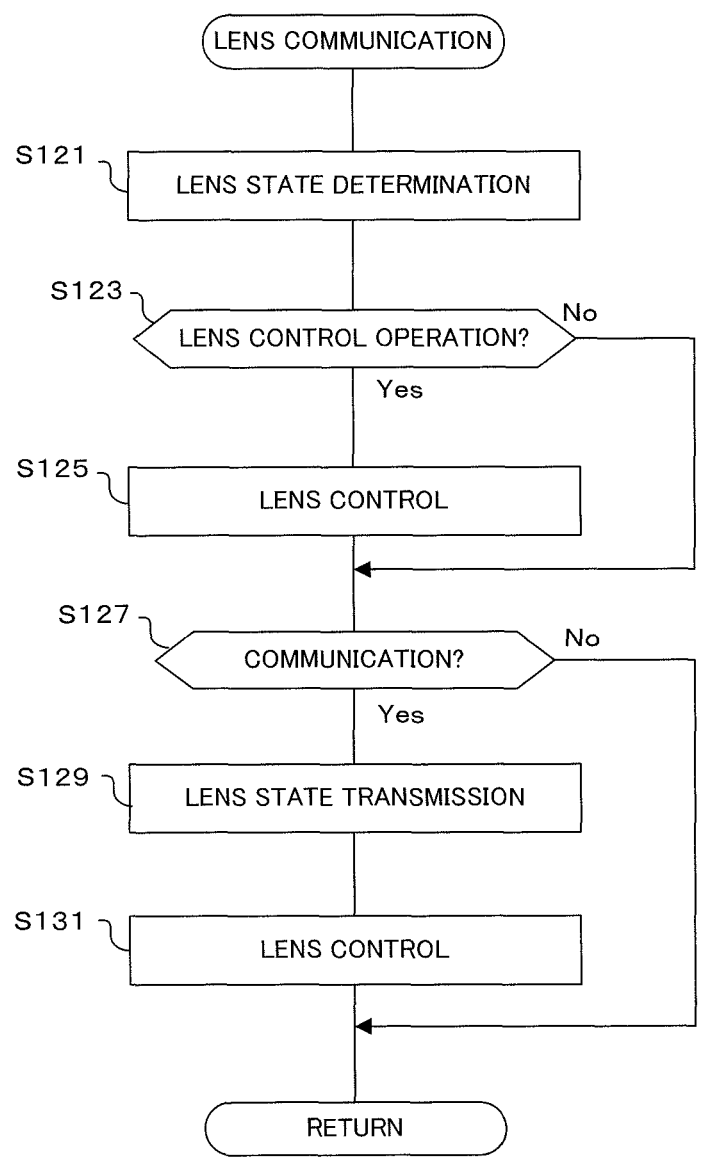
FIG. 7 is a flowchart showing operation of communication at a lens side of the first embodiment of the invention.

At time T6 association of an operation member and a function is performed, and association information is transmitted to the lens unit 20 (S53 and S55 of FIG. 4, and S109 and S11 of FIG. 6).

With this embodiment, slide determination is carried out at the camera body 10 side, but it is also possible to carry out determination at the lens unit 20 side. In this case, since information on slide start point and end point are required information on the position where touch was started and the position where touch was ended are transmitted one at a time. However, this is not limiting, and it is also possible to sequentially transmit point information such as that representing a slide locus. In these cases, it is preferable to have a configuration where start point and endpoint are determined from this locus at the lens unit 20.

FIG. 8B shows signal exchange at the time of lens operation. At time T11 the camera body 10 performs a communication request to the lens unit 20 (refer to S21 in FIG. 3). At time T12 the lens unit 20 carries out lens state communication for the communication request (refer to S129 in FIG. 7), and at time T13 the camera body 10 carries out switching in the event that there is a corresponding function (refer to S27 in FIG. 3). The same operations are repeated for time T14-T16 and time T17-T19.

Figure 9:
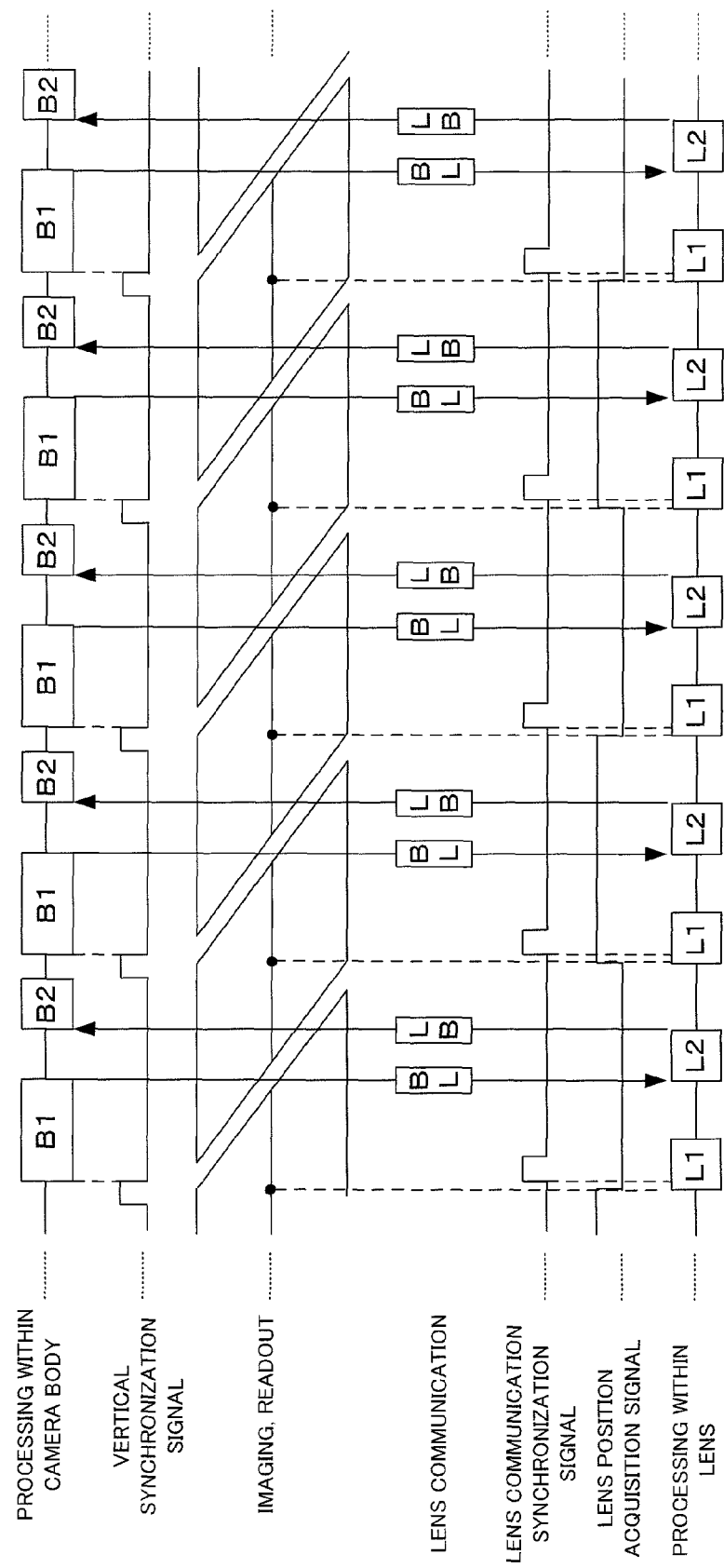
FIG. 9 is a timing chart showing one example of synchronization signals between the camera body and the lens in the imaging system of one embodiment of the present invention.

Next, details of synchronous communication that is carried out between the camera body 10 and the lens unit 20 in step S21 (refer to FIG. 3) will be described using the timing chart shown in FIG. 9. In FIG. 9, the horizontal axis represents the flow of time, while the vertical axis represents respective processing content and timing. In the camera body processing, in process B1 display of a live view image, and calculation of an AF evaluation value, are carried out using image data that was acquired in the previous frame. Also, in process B2 AF calculations and various setting changes etc. are carried out based on lens state data that was acquired from lens state communication.

A vertical synchronization signal is a signal that is output in correspondence with each frame. With imaging and readout, a subject image is formed on the image sensor 2, and image data of this formed image is read out. The imaging and readout have a rhombus shape in FIG. 9, which is because in this embodiment, at the time of acquiring a live view image a rolling shutter is adopted, and imaging and readout. are carried out sequentially every pixel line.

With the communication BL of the lens communication, a lens state data request command is transmitted from the camera body 10 to the lens unit 20, and this command requests transmission of data representing the lens state of the lens unit 20 to the camera body 10. Also in the communication LB, the lens unit 20 transmits data representing the lens state to the camera body 10 in response to the lens state data request command.

A lens communication synchronization signal is generated in response to a vertical synchronization signal in the camera body 10, and this lens communication synchronization signal is output to the lens unit 20 from a synchronization signal terminal of the communication section 11 of the camera body 10. A lens position acquisition signal changes state at a predetermined time, for example, with the example shown in FIG. 9, at a time point after a time point substantially at the central point time of a charge accumulation time of the image sensor 2.

Also, processing L1 within the lens unit 20 is processing to acquire position information of the focusing lens within the photographing lens 26 at a time where the lens position acquisition signal changes state, and detect operating state of the ring operating section 23*a* at a time when the lens communication synchronization signal is received. Also, processing L2 is processing to transmit position information of the focusing lens and lens state data such as operating state of the ring operating section 23*a*, in response to a lens state data request command that has been received from the camera body 10.

As shown in the timing chart of FIG. 9, with the synchronous communication of this embodiment, processing B1 within the camera body 10 is executed in synchronization with the vertical synchronization signal, and a lens communication synchronization signal is transmitted to the lens unit 20 in synchronization with the vertical synchronization signal.

Once processing B1 within the camera body 10 has been processed, a lens state data request command is transmitted to the lens unit 20 by communication BL. Once the lens unit 20 has received the lens state data request command, the lens state is detected and lens state data is transmitted by communication LB. The camera body 10 receives the lens state data and then executes processing B2.

Also, within the lens unit 20, processing L1 for acquiring lens position acquired by the position detection sections 25*a*, 25*b* is executed in synchronization with a lens position acquisition signal. This lens position acquisition signal is generated at a predetermined time, and with the example shown in FIG. 9 at a time point after half of a charge accumulation time has elapsed at the screen center of the image sensor 2. The lens unit 20 acquires position information of the focusing lens 25*a*, using the position detection section 25*b* for detecting position of the photographing lens at the time of state change of the lens position acquisition signal. These synchronous communications are all executed in synchronization with the lens communication synchronization signal.

Next, a display method for the operation section image 6L will be described using FIG. 10A and FIG. 10B. FIG. 10A shows image data coordinates for the operation section image 6L. As shown in FIG. 10A, coordinates for the lower left corner of the operating section image are made (0,0), coordinates of the upper right corner are made (XL, YL), coordinates of a lower corner of a line segment that divides the image into 2 equal parts are made (XL/2, 0), and coordinates of an upper corner of this line segment are made (XL/2, YL). Image data of the operation section image 6L is stored in the memory 27 together with these coordinates.

Figure 10B:
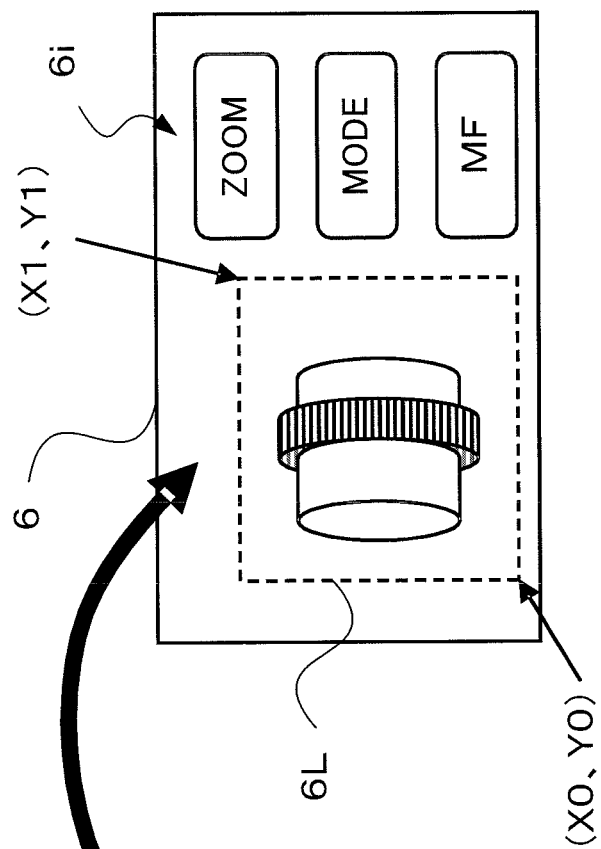
FIG. 10A and FIG. 10B are drawings showing a relationship between an image transmitted from the lens side and an image displayed at the camera body side, in the imaging system of one embodiment of the present invention.
Figure 10A:
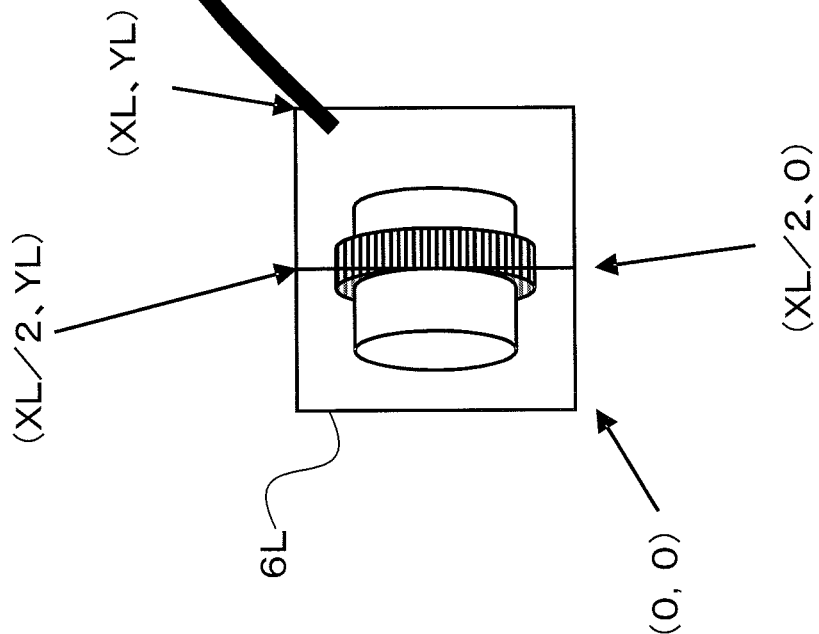

If image data of this operation section image 6L is transmitted from the lens unit 20 to the camera body 10, it is displayed from coordinates (X0, Y0) to (X1, Y1) on a display panel of the display section 6, as shown in FIG. 10B. Control of this display position is carried out by the display control section 1*d* within the signal processing and control section 1.

The coordinates of the operation section image 6L are stored from (XL/2, 0) to (XL/2, YL) of the memory 27 within the lens unit 20. If this coordinate information is required by the display control section 1*d* at the camera body 10 side, and the fact that positions from (XL+(X1+X0)/2, Y0) to (X0+(X1+X0)/2, Y1) has been touched is detected by the touch position detection section 1*c*, it is determined that the user has touched the operation section image 6L.

Also, display control for the icons 6*i* is carried out by the display control section 1*d* of the camera body 10, and which one of the plurality of icons has been touched is determined by the touch position determination section 1*c*. With this embodiment, the camera body 10 side display control section 1*d* carries out display control, but this is not limiting, and it is also possible for part or all of the display control to be carried out by the control section 21 within the lens unit 20.

Figure 11:
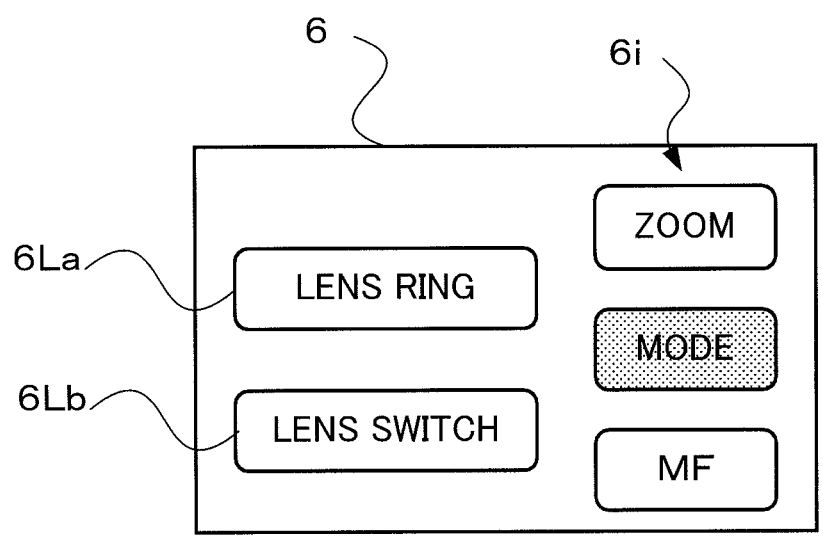
FIG. 11 is a drawing showing a modified example of an operating section image in the imaging system of one embodiment of the present invention.

Next, a modified example of the operation section image will be described using FIG. 11. In the one embodiment of the present invention, a display of the operating section was carried out using an image (operation section image 6L). However, this is not limiting, and display can also be performed using characters or symbols etc. For example, as shown in FIG. 11, a lens ring 6La and the lens switch 6Lb can also be displayed. With this modified example, as well as a lens ring corresponding to the ring operating section 23*a*, a lens switch corresponding to the lens operating section 23*b* can also be associated.

Figure 12A:
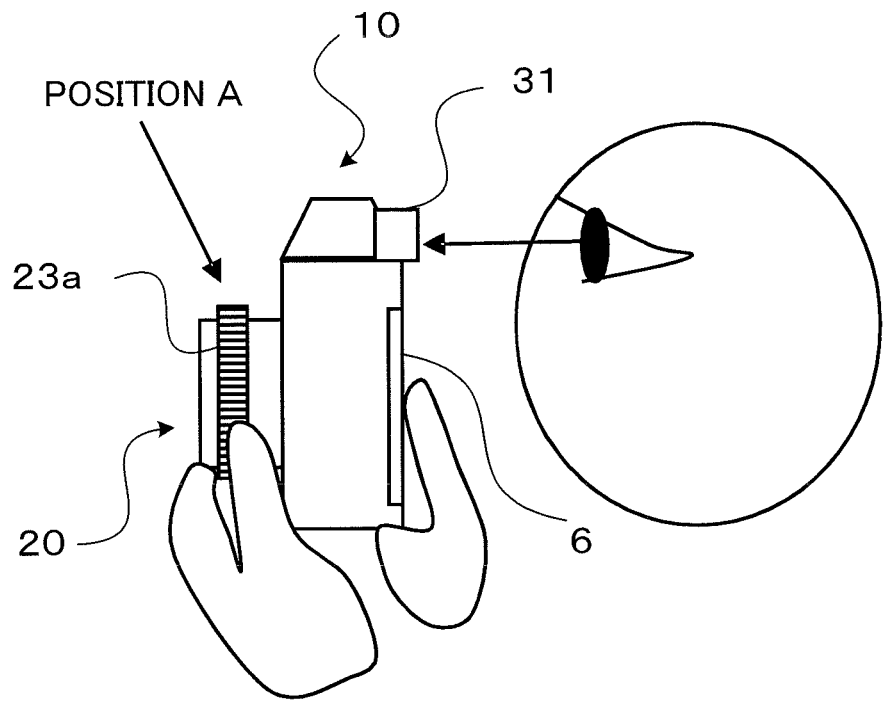
FIG. 12A and FIG. 12B are drawings for describing usage states of the modified example of the imaging system of one embodiment of the present invention.
Figure 12B:
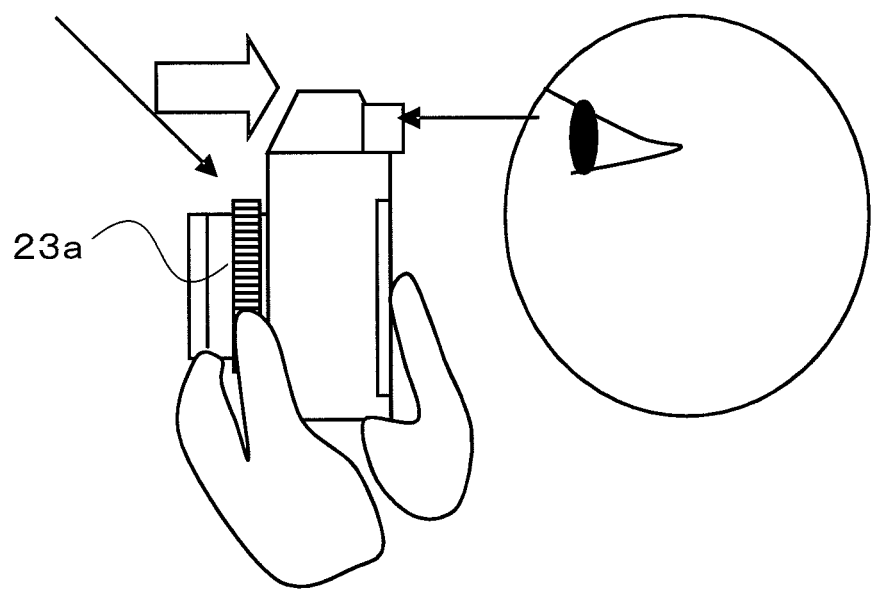

Next, a modified example of the operating section will be described using FIG. 12 to FIG. 14. With this modified example of the operating section, besides the ring operating section 23*a* it is also possible to carry out association using the lens operating section 23*b*. As shown in FIG. 12A an FIG. 12B, the ring operating section 23*a* is rotatable around the barrel of the lens unit 20, and slides back and forth along the optical axis direction. Specifically, in FIG. 12A the ring operating section 23*a* is at position A which is towards the front in the optical axis direction, and in FIG. 12B is at position the which is towards the rear in the optical axis direction. The lens operating section 23*b* has a slide mechanism that slides to position A or to position B, and slide positions A and B are detected by a switch, not shown.

Figure 13A:
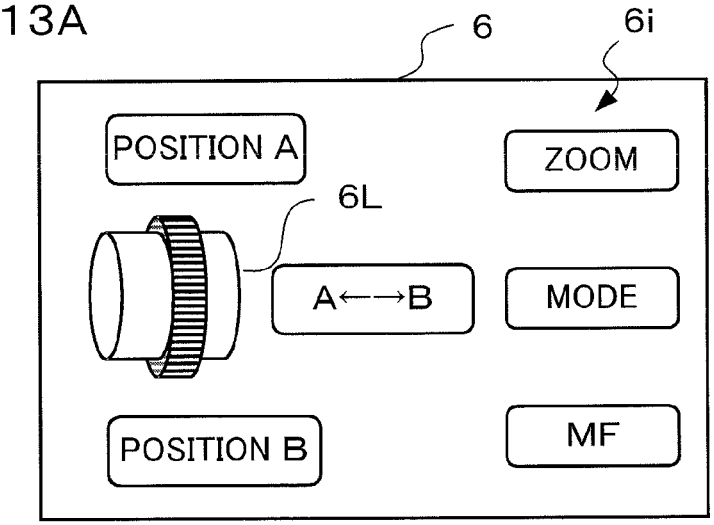
FIG. 13A-FIG. 13C are drawings showing display at the camera body side, for a modified example of the imaging system of the one embodiment of the present invention.
Figure 13B:
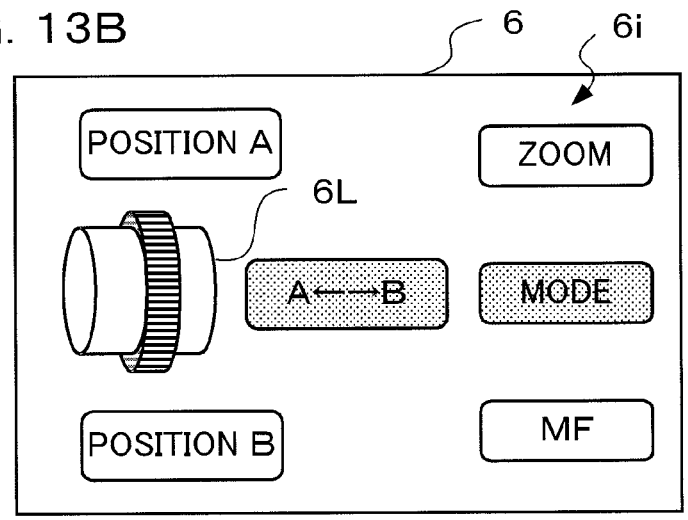
Figure 13C:
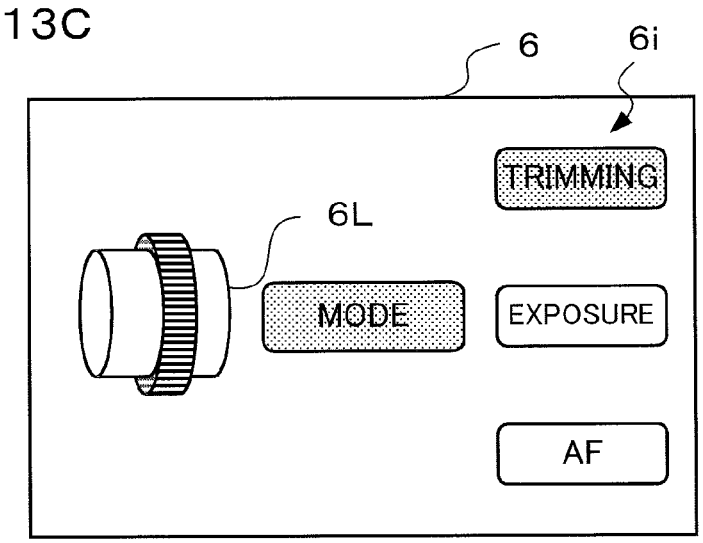

FIG. 13A-FIG. 13C show display of the modified example of the operating section in the display section 6. FIG. 13A is a state where an image of the operating section and icons are displayed, insteps S43 and S45. In FIG. 13A, the operation section image 6L shows that the ring operating section 23*a* is capable of moving to position A and position B, and the icons 6*i* indicate functions that are capable of being associated.

In the display state of FIG. 13A, if the user touches "A⇌B" and "mode", it is possible to set a function where mode is changed by sliding the ring operating section 23*a* back and forth, as shown in FIG. 13B. Further, since the ring operating section 23*a* is slid back and forth, the set mode changes sequentially in the order "trimming", "exposure", "AF", as shown in FIG. 13C. With the example shown in FIG. 13C, "trimming" is being selected.

FIG. 14 shows a trimming method in the case where trimming has been set in FIG. 13C. If the ring operating section 23*a* is at position A, then as shown in FIG. 14A, an operation section display 31*a* and a frame 31*b* showing the range of an optical zoom are displayed superimposed on liveview display. If the ring operating section 23a is slid in the optical axis direction towards position B while in this state, the mode switches to trimming mode.

In this state, as shown in FIG. 14B, the frame 31b is displayed with a face position detected by the face detection section 3 as a center. Since "expand/contract" is displayed to the side of the operation section display 31a, the user can understand that it is possible to expand or contract by trimming, using a rotation operation of the ring operating section 23a.

After returning to the state of FIG. 14A, if the ring operating section 23a is slid (shifted) in the optical axis direction towards position B, it is possible to change the trimming position in the sideways direction. Specifically, since "move sideways" is displayed to the side of the operation section display 31a, the user can understand that the trimming position is moved sideways using a rotation operation of the ring operating section 23a.

After returning to the state of FIG. 14A, if the ring operating section 23a is slid (shifted) in the optical axis direction towards position B, it is possible to change the trimming position in the vertical direction. Specifically, since "move vertically" is displayed to the side of the operation section display 31a, the user can understand that the trimming position is moved vertically using a rotation operation of the ring operating section 23a.

In this manner, with the modified example of the operation section, a plurality of operating sections (the ring operating section 23a and the lens operating section 23b) are respectively associated with functions. Assigning functions to the plurality of operating sections results in a number of combinations of operating section and function, and function rich assignment is made possible in variations. Also, if the association section associates the ring operation section with a function of the camera body, mode switching or parameter switching are carried out in accordance with rotation amount of the ring operation section.

With this modified example, description has been given using an example with the ring operating section 23a and a slide operation for the lens operating section 23b, but this is not limiting and it is also possible to provide a switch or the like, to enable myriad combinations.

Also, with this modified example, it is only necessary to carry out association for each operation section, in the flow charts shown in FIG. 3 to FIG. 7.

As has been described above, with the one embodiment and modified example of the present invention, information relating to operation of a ring operation member 26a etc. within the lens unit 20 is displayed on the display section 6, and information relating to the operating section is associated by being selected from among various functions. As a result, it is possible to enable association of an operating section provided of a barrel with an arbitrary function from the body side. Also, as shown with the one embodiment and modified example of the present invention, if a rear display panel that is easy to see and operate at the time of shooting is adopted, there will not be significant variation in the holding state at the time of shooting. Also, it is made possible to give undivided attention to shooting by enabling various settings swiftly without unnecessary operations at the time of shooting, which also prevents a photo opportunity being missed, and without the need to confirm the camera from various angle in order to locate an operation section. The effect of preventing hand shake can also be expected.

With the one example of the present. invention and the modified example thereof, the user's association operation at the time of carrying out association was carried out based on detection signals from the touch panel 7. However, the user operation when associating information relating to an operating section with a function of the camera body or the lens unit is not limited to one on the display panel, and it is also possible to carry out detection using another operation member, such as a cross-shaped button.

Also, with the one embodiment of the present invention and the modified example thereof, mode switching and parameter adjustment at the time of carrying out association were carried out using a rotation operation of the ring operating section 23a. However, this is not limiting, and it is also possible to perform switching and adjustment using an operating member at the camera body 10 side.

Further, with the one embodiment of the present invention and the modified example thereof, as functions to be subjected to association, there are both functions of the lens unit 20 and functions of the camera body 10, but it is possible to only have functions of one or the other.

With the one embodiment of the present invention and the modified example thereof, as a display section for when carrying out association, either the display section 6 arranged on the rear surface or the like of the camera body 10 of the eyepiece display section 31 within the ocular viewfinder 30 are used. However, selection of the display section can be suitably changed, and it is possible to use only one of them. Also, the display section also serves as a display panel for live view display, but it is also possible to provide a dedicated display section, or to have a configuration where the display section is combined with another display section.

With the one embodiment of the present invention and the modified example thereof, the lens unit is an interchangeable lens, but it is also possible to have a lens unit that is integrated with the camera body.

Also, with the one embodiment of the present invention and the modified example thereof, a digital camera has been described as a device for taking pictures, but as a camera it is possible to have a digital single lens reflex camera, a compact digital camera, or a movie camera etc.

Also, regarding the operation flow in the patent claims, the specification and the drawings, for the sake of convenience description has been given using words representing sequence, such as "first" and "next", but this does not mean that implementation must be in this order.

The present invention is not limited to the above-described embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging system, comprising:
    a) a lens unit having a barrel section including
        i) a photographing optical system,
        ii) an operating section provided on the barrel section, and
        iii) a transmission section for transmitting information relating to the operation section, wherein the information relating to the operating section includes operating section image data representing the operating section; and b) a camera body including
  i) an imaging section for converting a subject image formed by the photographing optical system into electrical signals,
  ii) a receiving section for receiving the information relating to the operating section that has been transmitted from the transmission section, and
  iii) an association section for (1) causing the information relating to the operation section that has been received by the receiving section to be displayed on a display, and (2) associating information relating to the operating section with functions of the camera body.

2. The imaging system of claim 1, wherein the association section (1) causes information relating to the operating section and a function of the camera body to be displayed on the display, and (2) receives a user input command associating the operating section with a function of the camera body, and
  wherein the act of associating information relating to the operation section with functions of the camera body is performed based on the received user input command.

3. The imaging system of claim 2, wherein the received user input command is based on a detection signal sourced from the touch panel.

4. The imaging system of claim 1, wherein the association section associates information relating to the operating section with either a function of the camera body or a function of the lens unit.

5. The imaging system of claim 1, wherein the functions of the camera body include mode switching and parameter switching.

6. The imaging system of claim 5, wherein in the case where mode switching has been selected, the association section causes the display to (1) stop display of a subject image, and (2) perform display of the subject image at the time of carrying out parameter switching.

7. The imaging system of claim 1, wherein the camera body transmits a result of association by the association section to the lens unit.

8. The imaging system of claim 1, wherein the operating section is a ring operating section capable of rotating around the barrel section, and
  wherein if the association section associates the ring operation section with a function of the camera body, mode switching and/or parameter switching are carried out in accordance with rotation of the ring operation section.

9. The imaging system of claim 1, wherein the lens unit has a plurality of operating sections, and transmits information relating to the plurality of operating sections via the transmission section.

10. The imaging system of claim 1, wherein the transmission section included in the lens unit is capable of transmitting information other than operating state relating to the operating section provided in the lens unit to the camera body.

11. The imaging system of claim 1, wherein the transmission section included in the lens unit is capable of transmitting information representing focus position and/or focal length of the photographing lens within the lens unit.

12. An imaging system, comprising:
a) a lens unit having a barrel section including
  i) a photographing optical system,
  ii) an operating section provided on the barrel section, and
  iii) a transmission section for transmitting information relating to the operation section, wherein the information relating to the operating section includes operating section image data representing the operating section; and
b) a receiving section for receiving the information relating to the operating section that has been transmitted from the transmission section; and
c) an association section for (1) causing the information relating to the operation section that has been received by the receiving section to be displayed on a display, and (2) associating information relating to the operating section with functions of the imaging system.

13. An imaging system, comprising:
a) a lens unit having a barrel section including
  i) a photographing optical system,
  ii) an operating section provided on the barrel section, and
  iii) a transmission section for transmitting information relating to the operation section, wherein the information relating to the operating section includes operating section image data representing the operating section;
b) a receiving section for receiving the information relating to the operating section that has been transmitted from the transmission section;
c) a display; and
d) an association section for (1) causing the information relating to the operation section that has been received by the receiving section to be displayed on the display, and (2) associating information relating to the operating section with functions of the imaging system.

* * * * *